US011301813B2

(12) United States Patent
Pagi et al.

(10) Patent No.: US 11,301,813 B2
(45) Date of Patent: Apr. 12, 2022

(54) DIGITAL PROCESSING SYSTEMS AND METHODS FOR HIERARCHICAL TABLE STRUCTURE WITH CONDITIONAL LINKING RULES IN COLLABORATIVE WORK SYSTEMS

(71) Applicant: MONDAY.COM LTD., Tel Aviv (IL)

(72) Inventors: Abigail Pagi, Herzliya (IL); Eliran Zagbiv, Tel Aviv (IL); Lior Kedem, Reshon LeTsiyon (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 17/243,892

(22) Filed: Apr. 29, 2021

(65) Prior Publication Data
US 2021/0349876 A1 Nov. 11, 2021

Related U.S. Application Data

(63) Continuation of application No. PCT/IB2021/000297, filed on Apr. 28, 2021, which is
(Continued)

(51) Int. Cl.
*G06F 16/00* (2019.01)
*G06Q 10/10* (2012.01)
(Continued)

(52) U.S. Cl.
CPC ....... *G06Q 10/103* (2013.01); *G05B 13/0265* (2013.01); *G06F 3/0482* (2013.01);
(Continued)

(58) Field of Classification Search
CPC ............... G06F 11/302; G06F 11/3409; G06F 11/3438; G06F 16/116; G06F 16/144;
(Continued)

(56) References Cited

U.S. PATENT DOCUMENTS

| 5,479,602 A | 12/1995 | Baecker et al. |
| 5,632,009 A | 5/1997 | Rao et al. |

(Continued)

FOREIGN PATENT DOCUMENTS

| CN | 107422666 A | 12/2017 |
| CN | 107623596 A | 1/2018 |

(Continued)

OTHER PUBLICATIONS

D'Elessio et al., Monday.com Walkthrough 2018\All Features, Platforms & Thoughts, Mar. 1, 2018, pp. 1-55, 2018.
(Continued)

*Primary Examiner* — Dinku W Gebresenbet
(74) *Attorney, Agent, or Firm* — Finnegan, Henderson, Farabow, Garrett & Dunner, LLP

(57) ABSTRACT

Systems, methods, and computer-readable media for implementing conditional rules in a hierarchical table structure are disclosed. The systems and methods may involve maintaining for presentation on a viewable interface a higher-level table structure having first rows, first columns and first cells at the intersections of the first rows and the first columns; maintaining for presentation on the viewable interface a lower-level table structure having second rows, second columns and second cells at the intersections of the second rows and second columns; linking the lower-level table to a specific first cell in the higher-level table; storing a specific conditional rule associating the specific first cell with a plurality of second cells of the lower-level table; receiving qualifying information from each of the plurality of second cells; and triggering the specific conditional rule to thereby update milestone information in the specific first cell of the higher-level table.

20 Claims, 24 Drawing Sheets

Related U.S. Application Data a continuation-in-part of application No. PCT/IB2021/000090, filed on Feb. 11, 2021, and a continuation-in-part of application No. PCT/IB2021/000024, filed on Jan. 14, 2021, and a continuation-in-part of application No. PCT/IB2020/000974, filed on Nov. 27, 2020, and a continuation-in-part of application No. PCT/IB2020/000658, filed on Aug. 7, 2020.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.

| | |
|---|---|
| *G06Q 10/06* | (2012.01) |
| *G06F 16/14* | (2019.01) |
| *G06F 16/23* | (2019.01) |
| *G06F 16/25* | (2019.01) |
| *G06F 16/11* | (2019.01) |
| *H04L 67/1095* | (2022.01) |
| *G06F 3/0482* | (2013.01) |
| *G06F 3/14* | (2006.01) |
| *H04L 51/046* | (2022.01) |
| *H04L 51/04* | (2022.01) |
| *G06F 40/279* | (2020.01) |
| *G06F 40/40* | (2020.01) |
| *G06F 40/30* | (2020.01) |
| *G06K 9/62* | (2022.01) |
| *G06F 3/04817* | (2022.01) |
| *G06F 3/16* | (2006.01) |
| *H04L 12/18* | (2006.01) |
| *G06F 16/22* | (2019.01) |
| *G06F 16/2455* | (2019.01) |
| *G06F 16/248* | (2019.01) |
| *G06F 40/177* | (2020.01) |
| *H04L 65/401* | (2022.01) |
| *G06N 20/00* | (2019.01) |
| *G06F 40/186* | (2020.01) |
| *G06F 3/0484* | (2022.01) |
| *G06F 11/30* | (2006.01) |
| *G06F 11/34* | (2006.01) |
| *G06F 40/103* | (2020.01) |
| *G06F 3/04845* | (2022.01) |
| *G06T 11/20* | (2006.01) |
| *G06F 16/909* | (2019.01) |
| *G06F 16/9038* | (2019.01) |
| *G06F 16/9032* | (2019.01) |
| *G06F 16/901* | (2019.01) |
| *G06F 16/951* | (2019.01) |
| *G06F 16/9536* | (2019.01) |
| *G06F 16/28* | (2019.01) |
| *G06F 16/26* | (2019.01) |
| *G06F 40/253* | (2020.01) |
| *H04L 51/18* | (2022.01) |
| *H04L 51/48* | (2022.01) |
| *G06F 16/903* | (2019.01) |
| *G05B 13/02* | (2006.01) |
| *B65D 83/04* | (2006.01) |

(52) U.S. Cl.
CPC ........ *G06F 3/0484* (2013.01); *G06F 3/04817* (2013.01); *G06F 3/04845* (2013.01); *G06F 3/1454* (2013.01); *G06F 3/165* (2013.01); *G06F 11/302* (2013.01); *G06F 11/3409* (2013.01); *G06F 11/3438* (2013.01); *G06F 16/116* (2019.01); *G06F 16/144* (2019.01); *G06F 16/2282* (2019.01); *G06F 16/23* (2019.01); *G06F 16/2308* (2019.01); *G06F 16/2393* (2019.01); *G06F 16/248* (2019.01); *G06F 16/2456* (2019.01); *G06F 16/24564* (2019.01); *G06F 16/24565* (2019.01); *G06F 16/258* (2019.01); *G06F 16/26* (2019.01); *G06F 16/287* (2019.01); *G06F 16/909* (2019.01); *G06F 16/9017* (2019.01); *G06F 16/9038* (2019.01); *G06F 16/90328* (2019.01); *G06F 16/90344* (2019.01); *G06F 16/951* (2019.01); *G06F 16/9536* (2019.01); *G06F 40/103* (2020.01); *G06F 40/177* (2020.01); *G06F 40/186* (2020.01); *G06F 40/253* (2020.01); *G06F 40/279* (2020.01); *G06F 40/30* (2020.01); *G06F 40/40* (2020.01); *G06K 9/6215* (2013.01); *G06N 20/00* (2019.01); *G06Q 10/0633* (2013.01); *G06Q 10/06312* (2013.01); *G06Q 10/06313* (2013.01); *G06Q 10/06316* (2013.01); *G06Q 10/063114* (2013.01); *G06Q 10/063118* (2013.01); *G06Q 10/101* (2013.01); *G06T 11/206* (2013.01); *H04L 12/1827* (2013.01); *H04L 51/04* (2013.01); *H04L 51/046* (2013.01); *H04L 51/18* (2013.01); *H04L 51/28* (2013.01); *H04L 65/4015* (2013.01); *H04L 67/1095* (2013.01); *B65D 83/0409* (2013.01); *G06F 2201/865* (2013.01); *G06F 2201/88* (2013.01); *G06F 2203/04803* (2013.01); *G06T 2200/24* (2013.01)

(58) Field of Classification Search
CPC .. G06F 16/2282; G06F 16/23; G06F 16/2308; G06F 16/2393; G06F 16/2456; G06F 16/24564; G06F 16/24565; G06F 16/248; G06F 16/258; G06F 2201/865; G06F 2201/88; G06F 2203/04803; G06F 3/04817; G06F 3/0482; G06F 3/0484; G06F 3/04845; G06F 3/1454; G06F 3/165; G06F 40/103; G06F 40/177; G06F 40/18; G06F 40/186; G06F 40/279; G06F 40/30; G06F 40/40

See application file for complete search history.

(56) References Cited

U.S. PATENT DOCUMENTS

| | | |
|---|---|---|
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,385,617 B1 | 5/2002 | Malik |
| 6,460,043 B1 | 10/2002 | Tabbara et al. |
| 6,496,832 B2 | 12/2002 | Chi et al. |

(56) References Cited

U.S. PATENT DOCUMENTS

| | | |
|---|---|---|
| 6,509,912 B1 | 1/2003 | Moran et al. |
| 6,522,347 B1 | 2/2003 | Tsuji et al. |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B2 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,720,602 B1 | 8/2017 | Chen et al. |
| 9,727,376 B1 | 8/2017 | Bills et al. |
| 9,798,829 B1 | 10/2017 | Baisley |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,628,002 B1 | 4/2020 | Kang et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,764 B1 | 8/2020 | Plenderleith |
| 10,747,950 B2 | 8/2020 | Dang et al. |
| 10,748,312 B2 | 8/2020 | Ruble et al. |
| 10,754,688 B2 | 8/2020 | Powell |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0039001 A1 | 2/2005 | Hudis et al. |
| 2005/0044486 A1 | 2/2005 | Kotler et al. |
| 2005/0086360 A1 | 4/2005 | Mamou et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |

(56) References Cited

U.S. PATENT DOCUMENTS

| | | |
|---|---|---|
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2007/0050322 A1* | 3/2007 | Vigesaa ............ G06F 16/24562 |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1* | 11/2008 | Hofmann ............ G06F 40/194 715/793 |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2010/0017699 A1 | 1/2010 | Farrell et al. |
| 2010/0070895 A1 | 3/2010 | Messer |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1* | 6/2010 | Yoon ..................... H03M 7/425 341/67 |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0089914 A1 | 4/2012 | Holt et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |

(56) References Cited

U.S. PATENT DOCUMENTS

| | | |
|---|---|---|
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0109012 A1 | 4/2014 | Choudhary et al. |
| 2014/0115518 A1 | 4/2014 | Abdukalykov et al. |
| 2014/0136972 A1 | 5/2014 | Rodgers et al. |
| 2014/0137144 A1 | 5/2014 | Jarvenpaa et al. |
| 2014/0173401 A1 | 6/2014 | Oshlag et al. |
| 2014/0188748 A1 | 7/2014 | Cavoue et al. |
| 2014/0195933 A1 | 7/2014 | Rao Dv |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0153943 A1 | 6/2015 | Wang |
| 2015/0169531 A1 | 6/2015 | Campbell et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0139884 A1 | 5/2017 | Bendig et al. |
| 2017/0153771 A1 | 6/2017 | Chu |
| 2017/0185668 A1 | 6/2017 | Convertino et al. |
| 2017/0221072 A1 | 8/2017 | AthuluruTlrumala et al. |
| 2017/0236081 A1 | 8/2017 | Smith et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0329479 A1 | 11/2017 | Rauschenbach et al. |
| 2017/0351252 A1 | 12/2017 | Kleifges et al. |
| 2017/0372442 A1 | 12/2017 | Mejias |
| 2018/0032570 A1 | 2/2018 | Miller et al. |
| 2018/0055434 A1 | 3/2018 | Cheung et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0276417 A1 | 9/2018 | Cerezo |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373757 A1 | 12/2018 | Schukovets et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |

(56) References Cited

U.S. PATENT DOCUMENTS

| | | |
|---|---|---|
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |

FOREIGN PATENT DOCUMENTS

| | | |
|---|---|---|
| CN | 107885656 A | 4/2018 |
| WO | WO 2004/100015 A2 | 11/2004 |
| WO | WO 2006/116580 A2 | 11/2006 |
| WO | WO 2017202159 A1 | 11/2017 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report and Written Opinion of the International Searching Authority in PCT/IB2020/000974, dated May 3, 2021 (19 pages).

International Search Report and Written Opinion of the International Searching Authority in PCT/IB2021/000024, dated May 3, 2021 (13 pages).

"Pivot table—Wikipedia"; URL: https://en.wikipedia.org/w/index.php?title=Pivot_table&oldid=857163289, originally retrieved on Oct. 23, 2019; retrieved on Jul. 16, 2021.

International Search Report in PCT/1B2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2020/000024, dated May 3, 2021 (13 pages).

"Pivot table—Wikipedia"; URL: https://en.wikepedia .org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

\* cited by examiner

● Design 1 — 306A

| | Subitems | Owner | Due by |
|---|---|---|---|
| Design Juno | ⋮⋮ | ⊗ | ○ Apr 15 |

302A

308A

| Subitems | Owner | Status | Stage |
|---|---|---|---|
| Research Study | ⊗ | Done | Research |
| Requirements Study | ⊗ | Done | Research |
| Feasibility Study | ⊗ | Done | Exploration |
| Concept Study | ⊗ | Done | Exploration |
| Preliminary Design | ⊗ | Done | Full Design |
| Detail Design | ⊗ | | Full Design |
| Integration and Test | ⊗ | | Design Complete |
| + Add | | | |

| | | | |
|---|---|---|---|
| Detail Braveheart | ⋮⋮ | ⊗ | ○ Apr 24 |
| Integration Universal | ⋮⋮ | ⊗ | ○ May.. |
| + Add | | | |

● Design 2 — 304A

| | Subitems | Owner | Due by |
|---|---|---|---|
| Design Atlas | ⋮⋮ | ⊗ | |
| Design Rapid Fire | ⋮⋮ | ⊗ | |
| Design Stone | ⋮⋮ | ⊗ | |
| + Add | | | |

DIGITAL PROCESSING SYSTEMS AND METHODS FOR HIERARCHICAL TABLE STRUCTURE WITH CONDITIONAL LINKING RULES IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

Consistent with some disclosed embodiments, systems, computer readable media, and methods for implementing conditional rules in a hierarchical table structure are disclosed. The embodiments may include maintaining for presentation on a viewable interface a higher-level table structure having first rows, first columns and first cells at the intersections of the first rows and the first columns. In addition, the embodiments may maintain for presentation on the viewable interface a lower-level table structure having second rows, second columns and second cells at the intersections of the second rows and second columns. Furthermore, the embodiments may link the lower-level table to a specific first cell in the higher-level table wherein the specific first cell may be configured to present a milestone indicator. Moreover, the embodiments may store a specific conditional rule associating the specific first cell with a plurality of second cells of the lower-level table such that entry of qualifying data into each of the plurality of second cells may trigger the specific conditional rule to cause a change in the specific first cell of the higher-level table. Furthermore, the embodiments may receive qualifying information from each of the plurality of second cells, and the embodiments may, upon receipt of the qualifying information from each of the plurality of second cells, trigger the specific conditional rule to thereby update milestone information in the specific first cell of the higher-level table.

Consistent with disclosed embodiments, systems, computer readable media, and methods for automatic generation of customized lower-level table templates based on data in an associated higher-level table structure are disclosed. The embodiments may include maintaining the higher-level table structure having first rows, first columns, and first cells at intersections of first rows and first columns where the first cells may be configured to hold value, and where the higher-level table structure may exhibit a plurality of characteristics that may include at least two of a table type, a table grouping, table content, a table size, a particular column heading, a particular item label, or an author. In addition, the embodiments may receive an input for triggering generation of a lower-level table template tied to the higher-level table structure. Furthermore, the embodiments may analyze at least one higher-level table characteristic including higher-level table type, higher-level table grouping, higher-level table content, higher-level table size, higher-level particular column heading, higher-level particular item label, or higher-level author. Moreover, based on the input and the analysis, the embodiments may determine a customization of the lower-level table template; the customization may include at least one of a lower-level column heading or a lower-level row heading. Furthermore, the embodiments may associate the customization with the lower-level table template to form a customized lower-level table structure. In addition, the embodiments may cause the lower-level table structure to be displayed in association with the higher-level table structure.

BRIEF DESCRIPTION OF THE DRAWINGS

FIG. 3A illustrates an example view of a hierarchical table structure, consistent with some embodiments of the present disclosure.

FIGS. 9A & 9B illustrates a specific first cell containing an original milestone indicator being replaced by an updated milestone indicator, consistent with some embodiments of the present disclosure.

DETAILED DESCRIPTION

Figure 1:
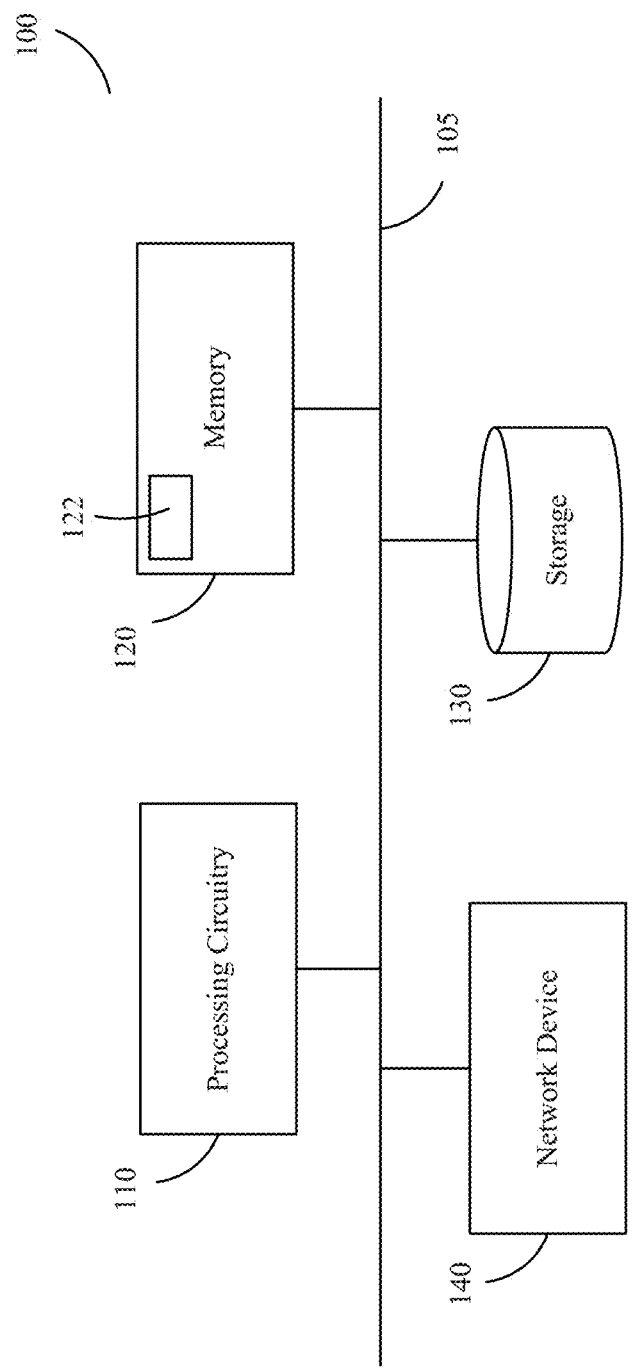
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underlie the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
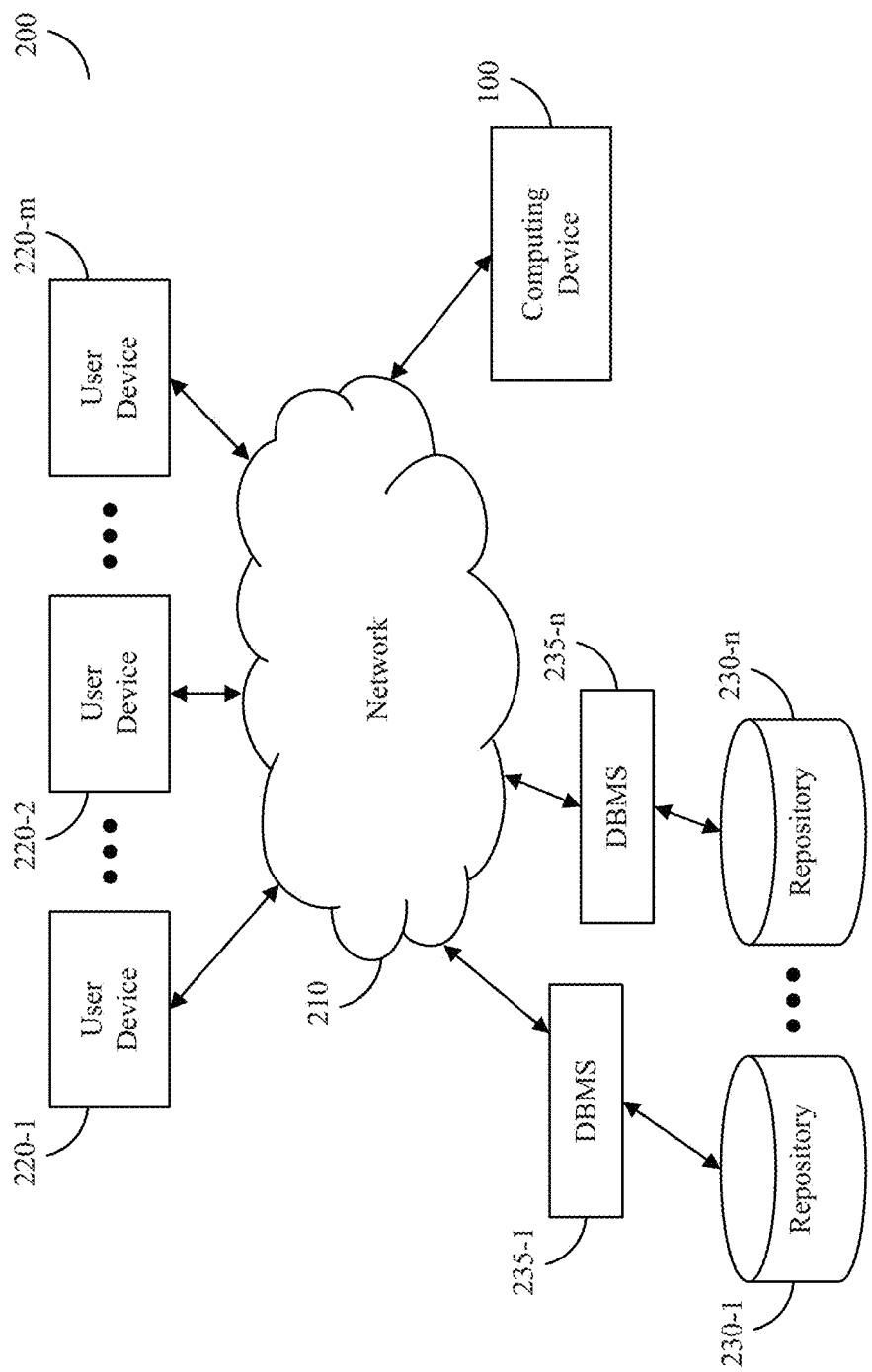
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may provide a technical solution to challenges associated with collaborative work systems. Disclosed embodiments include methods, systems, devices, and computer-readable media. For ease of discussion, an example system for automatic generation of customized lower-level table templates based on data in an associated higher-level table structure is described below with the understanding that aspects of the example system apply equally to methods, devices, and computer-readable media. For example, some aspects of such a system may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

Tools for automatic generation of customized lower-level table templates based on data in an associated higher-level table structure are lacking. Accordingly, the automatic generation of customized lower-level table templates based on data in an associated higher-level table structure may create efficiencies in data processing, reduce costs associated with memory, distributed memory, communication across multiple networks, and reliability needed in processors, and improve accuracy in the generation and display of customized lower-level table templates, lower-level table structure (which may include default values in its cells), and associated higher-level table structure.

Therefore, there is a need for unconventional methods, systems, devices, and computer-readable media for automatic generation of customized lower-level table templates based on data in an associated higher-level table structure. By using the disclosed computerized methods to ascertain the automatic generation of customized lower-level table templates based on data in an associated higher-level table structure, the embodiments provide advantages over prior systems that merely provide on demand table structures.

Some aspects of such system may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a system for implementing conditional rules in a hierarchical table structure having at least one processor (e.g., processor, processing circuit or other processing structure described herein) in collaborative work systems, including methods, devices, and computer-readable media. Conditional rules may refer to rules or instructions that may be tied to logical organization of elements for implementing one or more conditional actions. In some instances, the logical organization of elements may be a semantic statement (e.g., a sentence) or a conditional statement (e.g., "if X then Y"). In some instances, the conditional rules may be referred to as an "automation" or a "recipe." The conditional rules may be implemented as program codes or instructions stored in a non-transitory computer-readable medium of the system. The conditional rule may include one or more triggering elements (also may be referred to as "triggers") and one or more action elements (also may be referred to as "actions"). A trigger of the conditional rule may refer to an event or a condition, the occurrence or satisfaction of which may cause another event in the system that implements the conditional rules. An action of the conditional rule may refer to a change of one or more components of the system. A hierarchical table structure may refer to one or more tables arranged or organized into a tree-like structure, a cascade of tables, an array of tables, a network of tables featuring links, or a lattice of tables featuring connections between elements of a table. The one or more tables may be represented or structured as being above, below, inside or at the same level to one another. A table may include of any number horizontal and vertical rows (e.g., rows and columns). A table may be in a form of a board, a sub-board, an array, a grid, a datasheet, a set of tabulated data, a set of comma separated values (CSV), a chart, a matrix, or any other two or greater dimensional systematic arrangement of data or information. The structure of the one or more tables may be the same or different in the number of rows and columns. Furthermore, the hierarchical table structure may consist of one or more tables nested or embedded (may also be referred to as "sub-table," "sub-board," or "sub-item") inside a row, a column, or a cell of another table. The one or more tables may be linked to each other by way of the rows, columns, or cells of the tables. Furthermore, the hierarchical table structure may be arranged and organized with interrelated or unrelated elements containing data or information in the cells of the tables. For example, a hierarchical table may consist of altering data or information associated with a cell, a row of cells, or a column of cells in response to a trigger in a conditional rule causing an action to change data or information in a cell, row of cells, or column of cells in another table being above, below, inside, nested, or embedded.

By way of example, FIG. 3A illustrates an example view of a hierarchical table structure. FIG. 3A may include a hierarchical table structure 300A having a first table 302A and a second table 304A. The first table 302A may be structured with a plurality of rows and columns displaying data. The second table 304A may have the same structure as the first table. Furthermore, the first row 306A may contain an embedded or sub-table 308A having a different structure from the first table and the second table. A sub-table may be associated with each of the first table 302A and/or the second table 304A and may have its own number of rows and columns that may be different or the same as the first table or the second table.

Figure 3B:
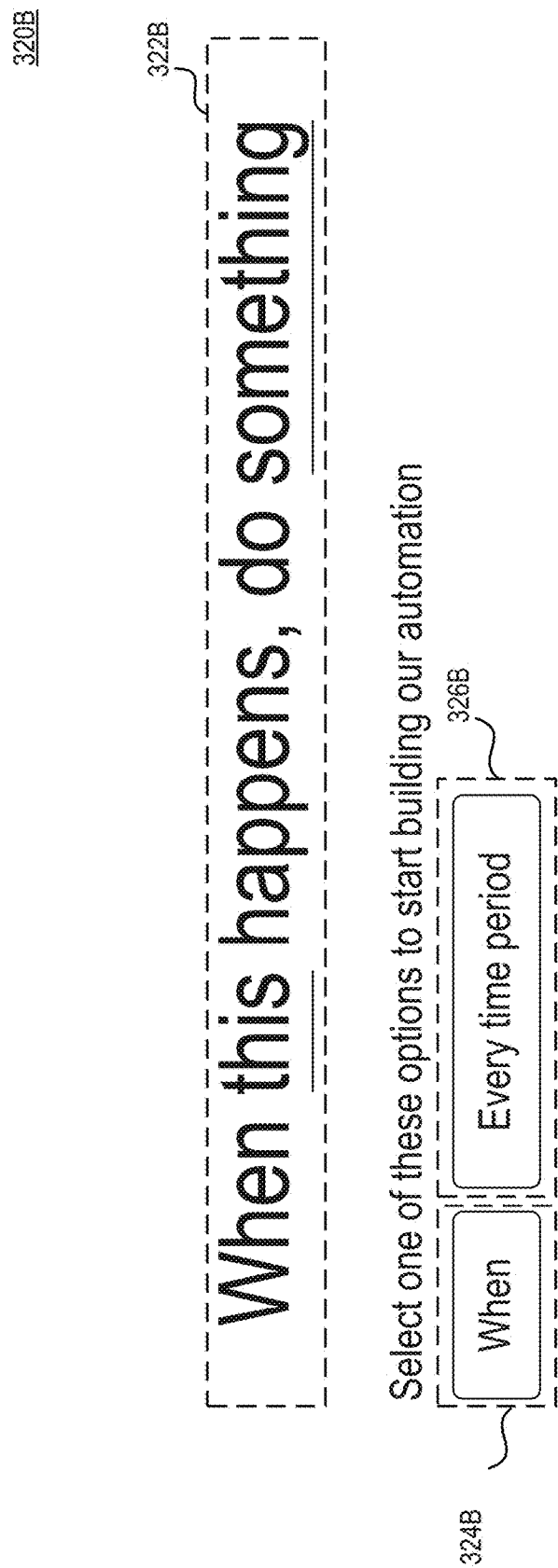
FIG. 3B illustrates an example conditional rule displayed in a user interface, consistent with embodiments of the present disclosure.

In another example, FIG. 3B illustrates an example conditional rule 320B displayed in a user interface 320B. As illustrated in FIG. 3B, the user interface 320B may be displayed on a computing device (e.g., the computing device 100 illustrated in FIG. 1) or software running thereon. For example, the user interface 320B may be a portion of a graphical user interface (GUI), such as a webpage or a mobile application GUI displayed on a screen of the computing device 100. As illustrated in FIG. 3B, the user interface 320B displays conditional rule 322B ("When this happens, do something") as a whole or a partial sentence. The conditional rule 322B may include a trigger "when this happens" and an action "do something." In accordance with the conditional rule 322B, when the condition "this" is satisfied or the event "this" occurs, the system may cause "something" to occur (i.e., a change of a component or hierarchical table). Furthermore, the conditional rule 322B includes predefined requirements "when," "happens," and "do," and user-definable requirements "this" and "something." For example, the predefined requirement "when" may only be activated as a whole by receiving a user input indicating that a user selects an interactive element 324B (e.g., a button). In another example, the predefined requirement "when" may only be deactivated as a whole by receiving a user input indicating that a user clicks an interactive element 326B (e.g., a button) so that the predefined requirement may be removed and may be replaced.

Consistent with some disclosed embodiments, at least one processor of the system may carry out operations that may involve maintaining for presentation on a viewable interface a higher-level table structure having first rows, first columns and first cells at intersections of first rows and first columns. Maintaining a higher-level table structure for presentation on a viewable interface may involve storing a higher-level table structure in memory that may be accessed for a presentation or display on any viewable interface. A viewable interface may involve a user interface or a graphical user interface (GUI) that may be a web page, a mobile-application interface, a software interface, or any graphical interface that could enable interactions between a human and a machine via an interactive element. The viewable interface may include, for example, a monitor, touchscreen display, projector, AR/VR lens, or any other viewable interface. The interactive element may include any device such as a mouse cursor, a touchable area (as on a touchscreen), an application program interface (API) that receives a keyboard input, or any hardware or software component that may receive user inputs. A higher-level table structure or higher-level table may refer to a table, as described above, having a hierarchy that may be above other tables (e.g., a main table). The higher-level table structure may include one or more tables nested or embedded beneath a row, a column, or a cell of the higher-level table. The higher-level table structure may include any combination of structures such as rows, columns, and cells at the intersections of the rows and columns. The higher-level table structure may be configured to contain information that may be subsequently changed or altered. References made to "first," "second," and so on do not necessarily indicate an order and may be used in reference to a particular group.

Figure 4:
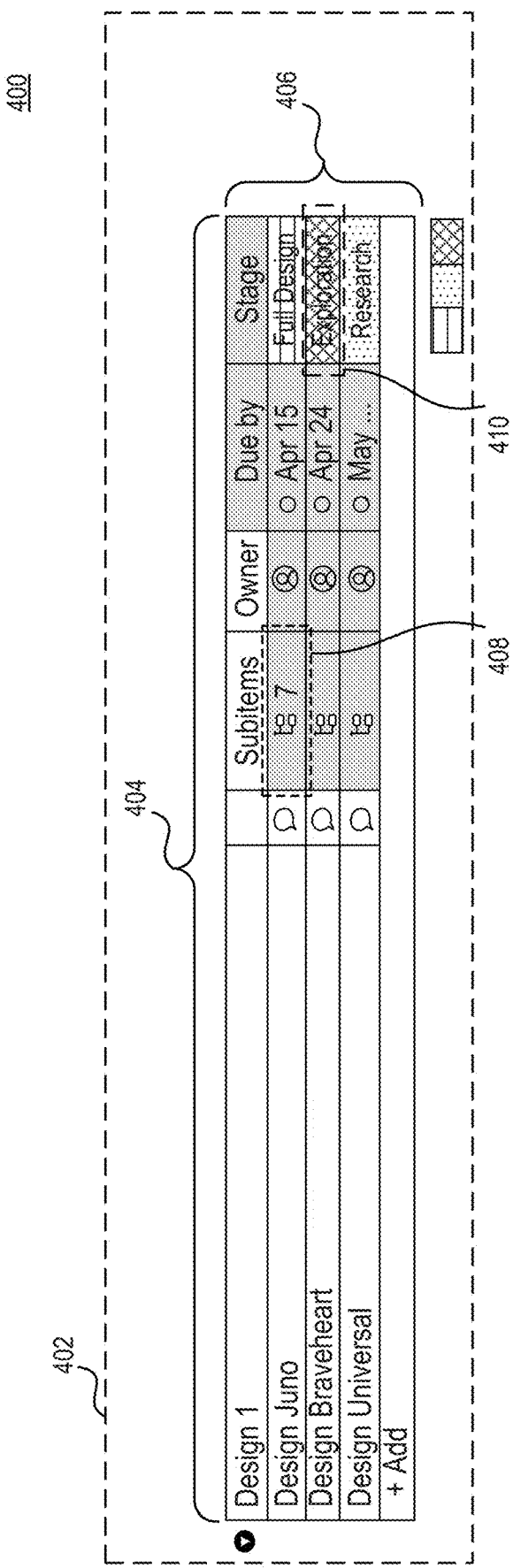
FIG. 4 illustrates a higher-level table structure presented on a viewable interface, consistent with some embodiments of the present disclosure.

By way of example, FIG. 4 illustrates a higher-level table structure 402 presented on a viewable interface 400. As illustrated in FIG. 4, the viewable interface 400 may be displayed or presented with the higher-level table structure 402. The higher-level table structure 402 may have a first plurality of columns 404, rows 406, and representative cells 408 and 410. The higher-table structure 402 may have subitem cell 408 that may contain an embedded or nested table (not shown). A user may click subitem cell 408 in viewable interface 400 to display the embedded or nested table.

In some embodiments, at least one processor of the system may carry out operations that may involve maintaining for presentation on the viewable interface a lower-level table structure having second rows, second columns and second cells at intersections of second rows and second columns. A lower-level table structure or lower-level table may refer to a table, as described above, having a hierarchy that may be below the higher-level table structure, as described above. The lower-level table structure may be positioned under a first row, a first column, or a first cell of a higher-level table structure. The lower-level table structure may also have the same functions or characteristics of the higher-level table, such as table structure or associations with automations. The lower-level table structure may have the same structure as the higher-level table structure, or may have a structure that is independent from the higher-level table structure. Similar to the higher-level table structure, the lower-level table structure may also contain another embedded or nested table beneath its rows, columns, or cells (which may be referred to as the second rows, second, columns, and second cells). A change or alteration of the data (information or arrangement of information) in the lower-level table structure may subsequently also change or alter the data in the higher-level table structure, and vice-versa. Furthermore, the lower-level table structure includes nested or embedded tables underneath its second rows, second columns, or second cells. A change or alteration of the data contained in the nested or embedded tables of the lower-level table structure may in turn change or alter the data of the lower-level table structure, and vice-versa.

Figure 5:
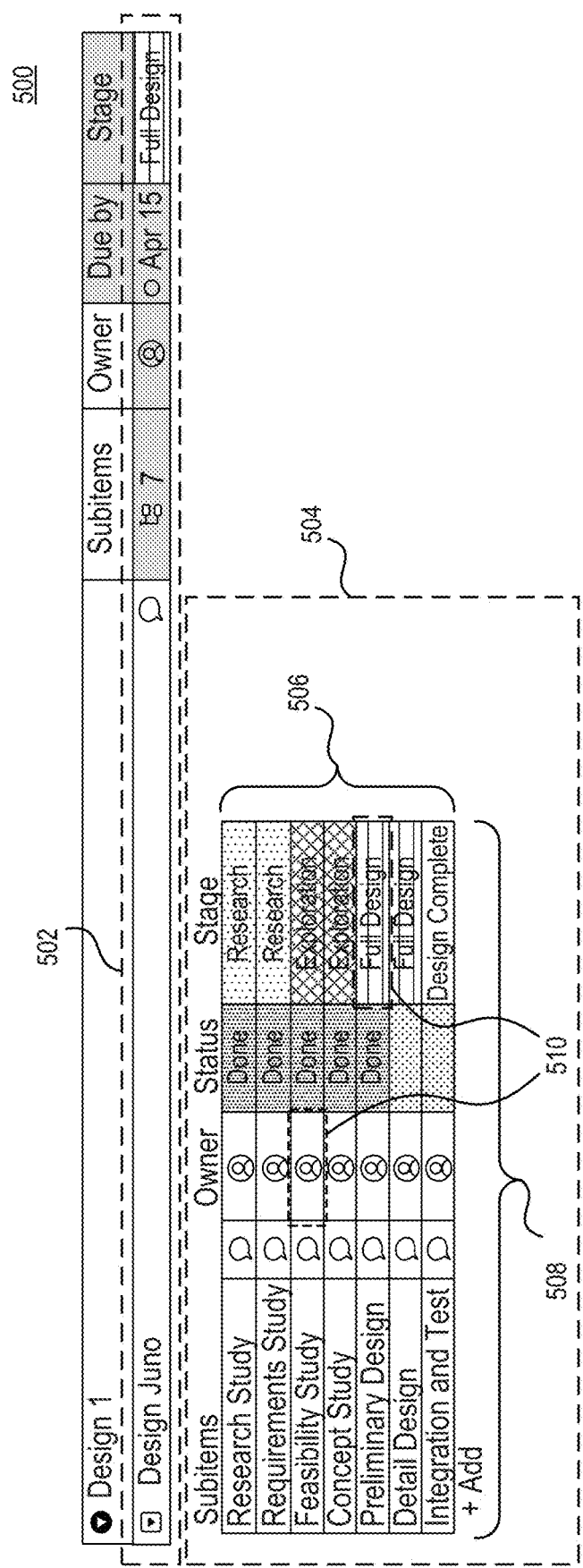
FIG. 5 illustrates a lower-level table structure presented on a viewable interface, consistent with some embodiments of the present disclosure.

By way of example, FIG. 5 illustrates a lower-level table structure 504 presented on a viewable interface 500, consistent with some embodiments of the present disclosure. As illustrated in FIG. 5, the viewable interface 500 may display a first row 502 of a higher-level table structure. The lower-level table structure 504 may be positioned as an indentation under the first row 502 or in any other manner to indicate that it is associated with the higher-level table structure. The lower-level table 504 may contain a plurality of rows 506, columns 508, and cells 510.

Consistent with some disclosed embodiments, at least one processor of the system may carry out operations that may involve linking the lower-level table to a specific first cell in the higher-level table, wherein the specific first cell is configured to present a milestone indicator. Linking the lower-level table to a specific first cell in the higher-level table may refer to establishing a relationship via a link between the one or more elements of the lower-level table and a specific cell in the higher-level table. By activating this link, a user may be able to access information in either the specific cell in the higher-level table or information in the lower-level table tied to that specific cell of the higher-level table. For example, one or more second cells (e.g., elements) in the lower-level table may be linked to a specific cell in the higher-level table. A change in information in the lower-level table may cause the link to the specific cell to be activated, which may cause a change or alteration in the data or information of the specific cell of the higher-level table. A milestone indicator may refer to a marker, a designation, a reference point, or any other indication representative of milestone information. The indicator may include any indication such as through alphanumerics, graphics, dynamic information, or a combination thereof. For example, a milestone indicator may enable a user to view the status of tasks or goals for a project or event. For instance, a milestone indicator may mark a specific point along a project timeline (e.g., start, middle phase, end phase, and so on), an indication of importance or condition of an activity associated with a project task. The milestone indicator may be a marker or signal that may express the success or completion of a task. For example, the specific first cell may display summary information through graphical representation (e.g., text, numbers, alphanumeric, symbols, forms, or a combination thereof) associated with the data or information in the second cells of the lower-level table structure. A user may obtain summary information from the specific cell to reach a conclusion of the status of the project without necessarily seeing the data or information contained in the second cells of the lower-level table. A change in the one or more second cells may alter the milestone indicator in the specific first cell.

Figure 6:
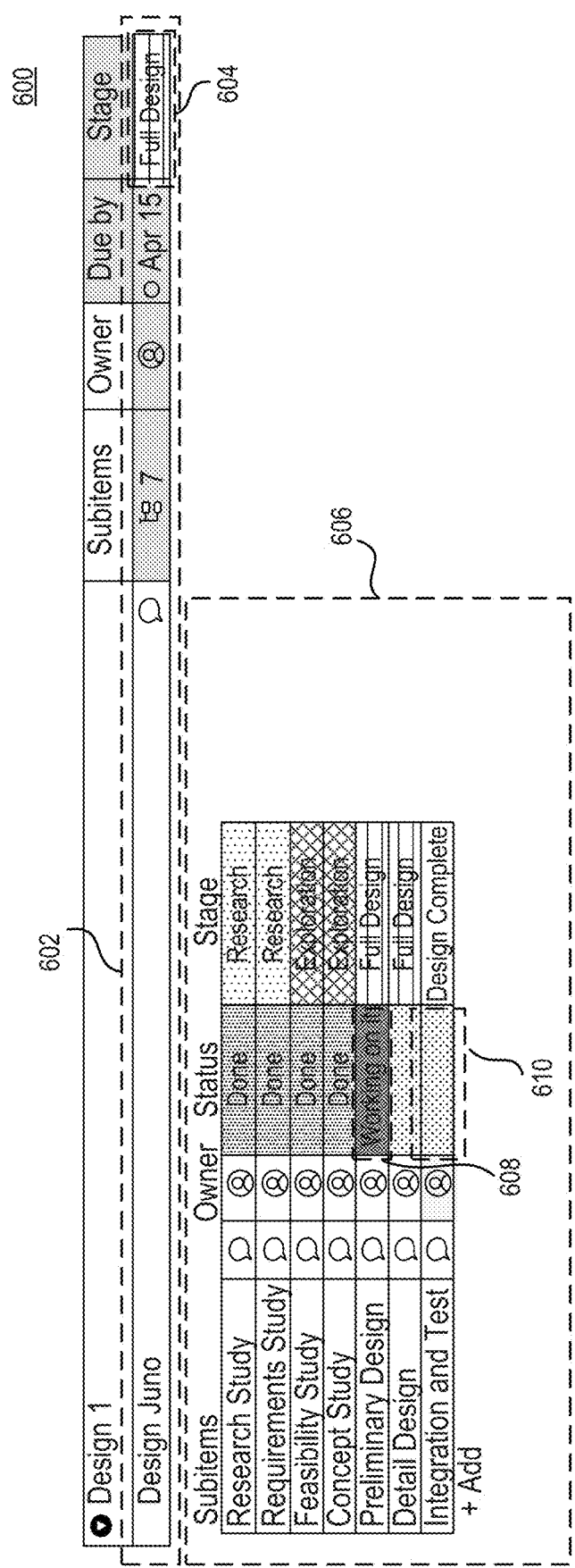
FIG. 6 illustrates an example view of linking a lower-level table to a specific cell in a higher-level table having a milestone indicator, consistent with some embodiments of the present disclosure.

By way of example, FIG. 6 illustrates linking a lower-level table to a specific cell in a higher-level table, the specific call including a milestone indicator. As illustrated in FIG. 6, higher-level table 600 may have a first row 602 with a specific first cell 604 displaying a "stage" milestone indicator. The specific first cell 604 may be linked to a lower-level table 606. When a second "status" cell 608 of the lower-level table 606 changes from being empty to displaying the status "Working on it," the specific first cell 604 displays the milestone indicator of "Full Design" as a stage, since the second "status" cell 608 is associated with the "Full Design" stage of the project in lower-level table 606.

In some embodiments, at least one processor of the system may carry out operations that may involve storing a specific conditional rule associating the specific first cell with a plurality of second cells of the lower-level table, such that entry of qualifying data into each of the plurality of second cells triggers the specific conditional rule to cause a change in the specific first cell of the higher-level table. A plurality of second cells may refer to cells that may be adjacent (e.g., sharing the same borders, preceding each other, touching, adjoining, contiguous, juxtaposed, being in close proximity, or being nearby, or any other combination thereof) to each other that may be associated with the lower-level table. Storing a specific conditional rule may refer to a particular conditional rule, as described above, that may be stored in memory or a repository. The specific conditional rule may be associated with a specific cell of the higher-level table structure and the plurality of second cells associated with the lower-level table structure such that information contained in the specific cell of the higher-level table structure may be affected or otherwise altered in response to information associated with the plurality of second cells, according to the specific conditional rule. The specific conditional rule may have one or more triggers and one or more actions that may cause the specific cell to change or alter summary information based on changes in the second rows, columns, cells of the lower-level table that meet the conditional triggers (triggered in response to a threshold being met). Qualifying data may refer to any information that meets a threshold and thereby qualify to meet a condition that may trigger a conditional rule. The qualifying data may include but is not limited to one or more keywords, values, qualifiers that may be represented as numbers, letters of the alphabets, alpha-numeric values, syntax, or mathematical expressions, or any other representation or combination thereof. The qualifying data may be entered data in a cell or may be selected from a list of values. For example, the qualifying data may be a constant from a list of values associated with a milestone indicator. A column in the lower-level table may include a "status" column that may display milestone indicators such as "Working on it," "Stuck," or "Done" as options that a user may select. The user may select label "Done" to provide the status associated a task in the lower-level table. The status of "Done" in the lower-level table may be qualifying data that may trigger a conditional rule that alters a specific cell of the higher-level table to reflect that all of the sub-tasks in the lower-level table structure have been marked "Done." For example, where a lower-level table contains multiple sub-tasks for different phases of a project, a conditional rule may be configured to reflect the progress of the sub-tasks in a specific cell of the higher-level table structure, such as a number of sub-tasks completed or a phase in which the sub-tasks are in progress.

Figure 7A:
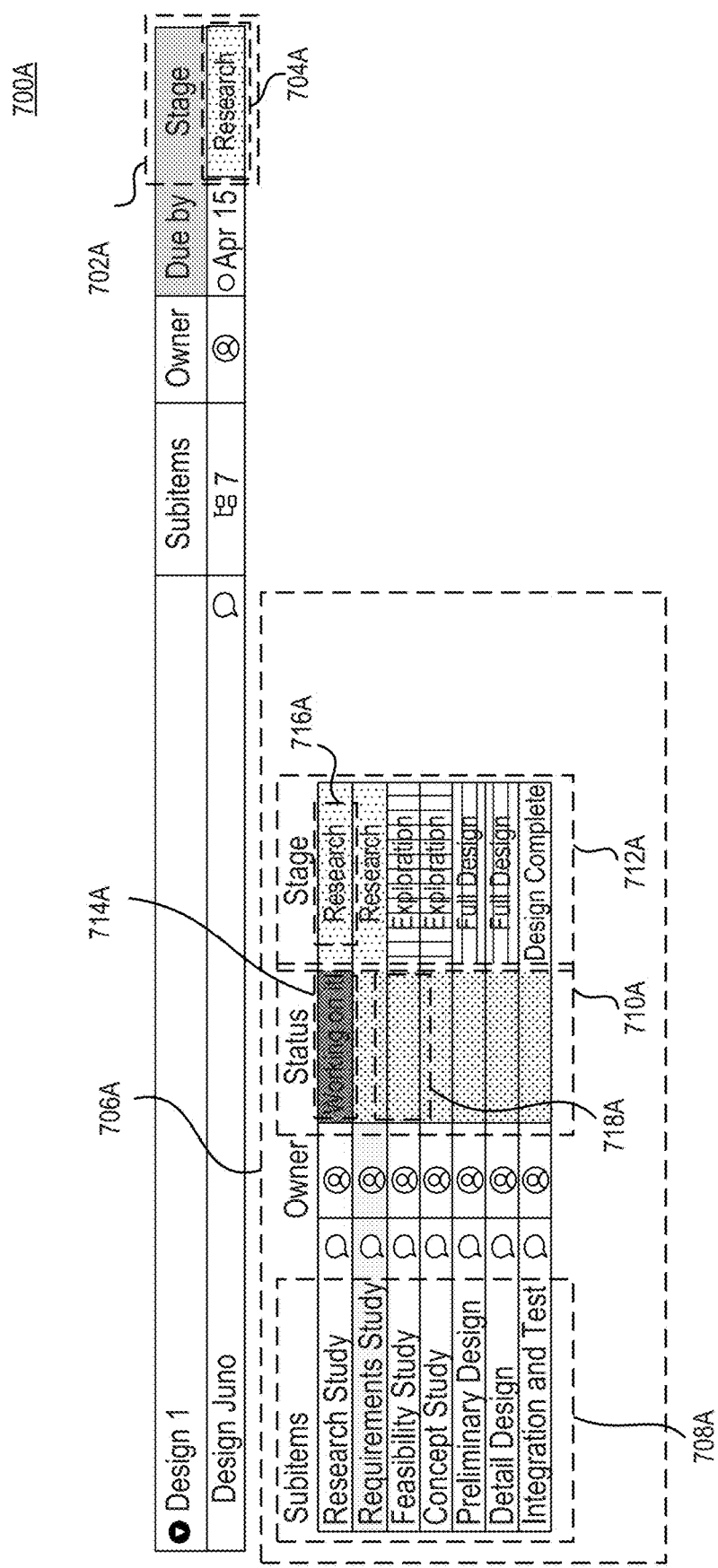
FIG. 7A illustrates a first use case of an example view of qualifying data in a plurality of seconds cells triggering a specific conditional rule to change a specific first cell, consistent with some embodiments of the present disclosure.

By way of example, FIG. 7A illustrates a use case of an example view of qualifying data in a plurality of seconds cells in a lower-level table structure triggering a specific conditional rule to change a specific first cell of a higher-level table structure. As illustrated in FIG. 7A, higher-level table 700A may include a "Stage" first column 702A, which may include varying input options such as "Research," "Exploration," "Full Design," and "Design Complete." A specific first cell 704A may display information as a milestone indicator that the current stage is "Research." The higher-level table 700A may include a lower-level table 706A. The lower-level table may include a "Subitem" column 708A, a "Status" column 710A, and a "Stage" column 712A. The "Subitem" column 708A may include a plurality of cells displaying different tasks associated with qualifying data for the stage, as shown in the "Stage" column 712A. The "Status" column 710A and "Stage" column 712A may display milestone indicators with respect to each of the subitems. The "Status" column 710A may also be associated with different input options such as "Done," "Stuck," or "Working on it" for its plurality of cells. The "Stage" column 712A may input options such as "Research," "Exploration," "Full Design," and "Design Complete" for its plurality of cells. A cell 714A of the lower-level table 706A may include a milestone indicator such as "Working on it," and another cell 716A of the lower-level table 706A may include a milestone indicator of "Research." A specific conditional rule 720B of FIG. 7B may associate the specific cell 704A of the higher-level table 700A to the plurality of cells in "Status" column 710A and "Stage" column 712A of the lower-level table structure 706A. As a user or owner may start performing a task listed in the plurality of second cells under "Subitems" column 708A, the cell 714A and cell 716A may have as milestone indicators "Working on it" and "Research," which may be the qualifying data that may trigger the specific conditional rule 720B (of FIG. 7B) to alter the specific cell 704A to display that the project is currently in the "Research" stage.

Figure 7B:
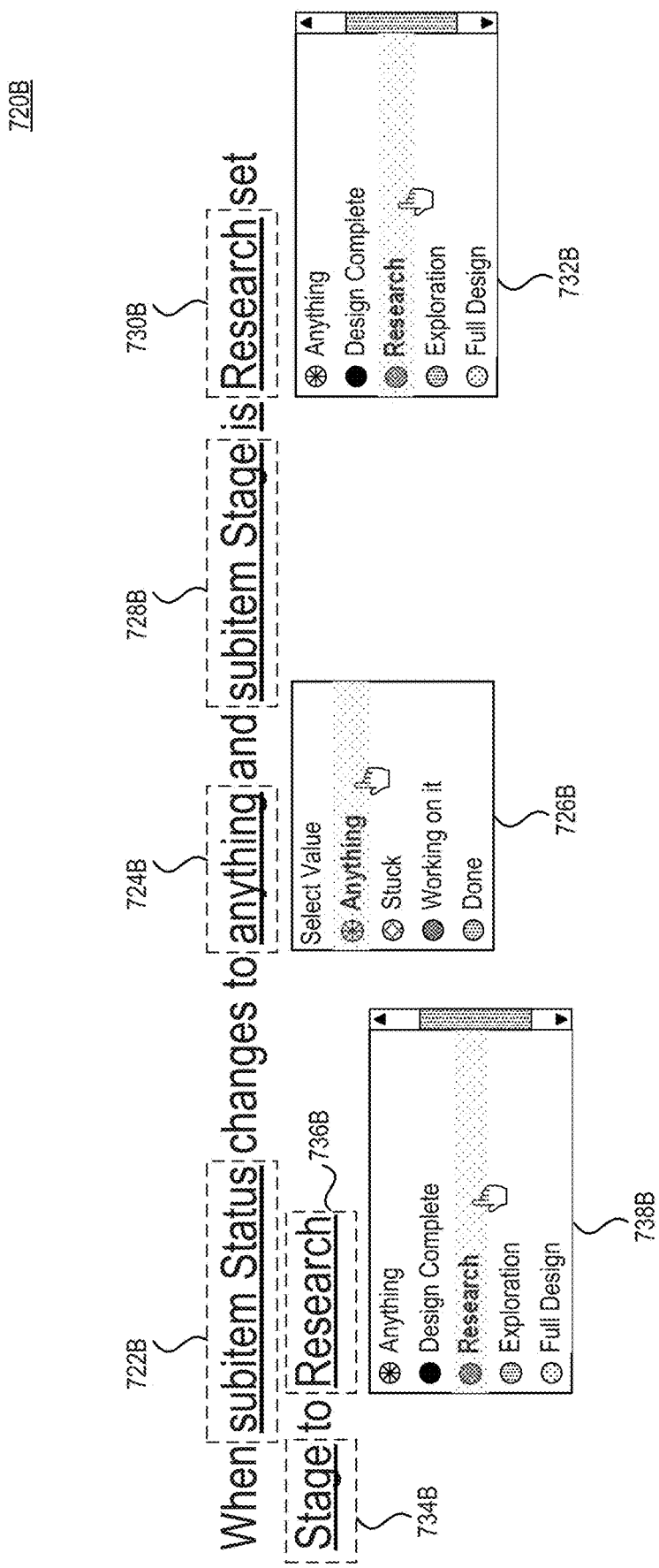
FIG. 7B illustrates a first use case for a specific conditional rule associating the specific first cell with a plurality of second cells, consistent with some embodiments of the present disclosure.

In another example, FIG. 7B illustrates an exemplary conditional rule associating a specific first cell (of a higher-level table) with a plurality of second cells (of a lower-level table), consistent with some embodiments of the present disclosure. As illustrated in FIG. 7B, specific conditional rule 720B may include a conditional statement—"When subitem Status changes to anything and subitem Stage is Research, set Stage to Research." Specific conditional rule 720B may also include triggers—"When subitem Status changes to anything" and "subitem Stage is Research"—and actions—"set Stage to Research." Each of the configurable fields 722B, 724B, 728B, 730B, 734B, and 736B of the conditional rule 720B may be configured by an input, such as a selection a pick list associated with each of the fields (e.g., pick lists 738B, 726B, and 732B). Each of the configurable fields may be mapped to specific columns, for example, from a higher-level or lower-level table as shown in FIG. 7A. The trigger, "subitem Status" 722B, may be linked to the "Status" column 710A in FIG. 7A. The trigger, "anything" 724B, may be an indication that any of the statuses (e.g., Done, Working on it, Stuck) may be considered to be qualifying data for the plurality of second cells in the "Status" column 710A of FIG. 7A. The trigger, "subitem Stage" 728B may be linked to the "Stage" column 712A of FIG. 7A. The trigger "Research" 730B may be the qualifying data necessary to trigger the conditional rule 720B to carry out the action of "set Stage to Research," as indicated by the remainder of the conditional rule 720B in FIG. 7B.

Figure 7C:
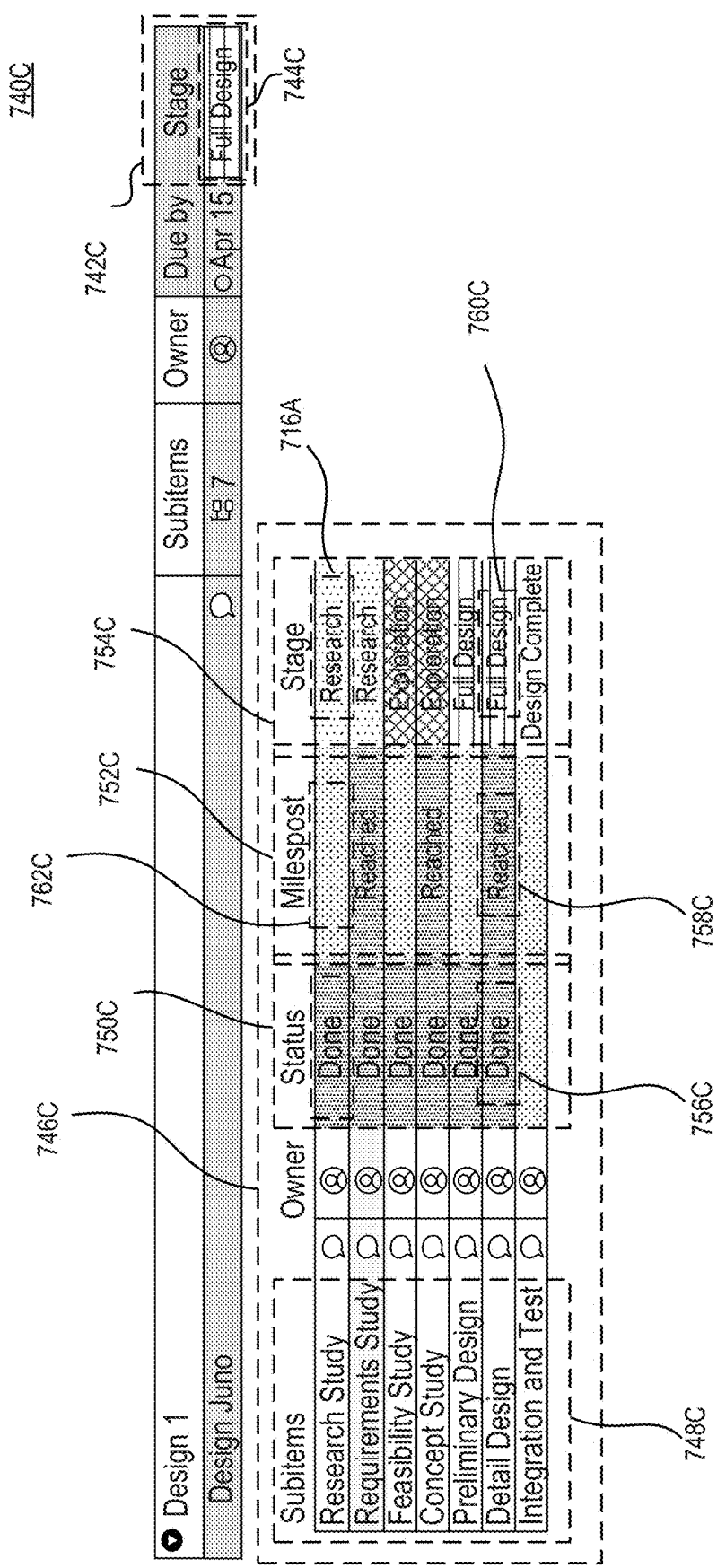
FIG. 7C illustrates a second use case of an example view of qualifying data in a plurality of seconds cells triggering a specific conditional rule to change a specific first cell, consistent with some embodiments of the present disclosure.

FIG. 7C illustrates another case of an example view of qualifying data in a plurality of seconds cells of a lower-level table triggering a specific conditional rule to change a specific first cell of a higher-level table, consistent with some embodiments of the present disclosure. As illustrated in FIG. 7C, higher-level table 740C may include a "Stage" first column 742C having a specific first cell 744C. The higher-level table 740C may also include lower-level table 746C that may include "Subitems" second column 748C, "Status" second column 750C, "Milepost" second column 752C, and "Stage" second column 754C. A specific conditional rule 760D, described further below in reference to FIG. 7D, may be triggered to cause the specific first cell 744C to display as milestone indicator "Full Design" because the cell 756C and the cells above it have been marked "Done," which all may be qualifying data that trigger the conditional rule 760D. Additionally or alternatively, another cell 758C may be marked as "Reached" to indicate that all of the previous subitems have reached a particular milepost, which may be the qualifying data for triggering the conditional rule 760D. In both of these situations, cell 756C and 758C are both associated with a "Full Design" stage as indicated by cell 760C, which may also be considered qualifying data for triggering the conditional rule 760D to update the specific cell 744C to present a "Full Design" stage to reflect the progress in the lower-level table 746C.

Figure 7D:
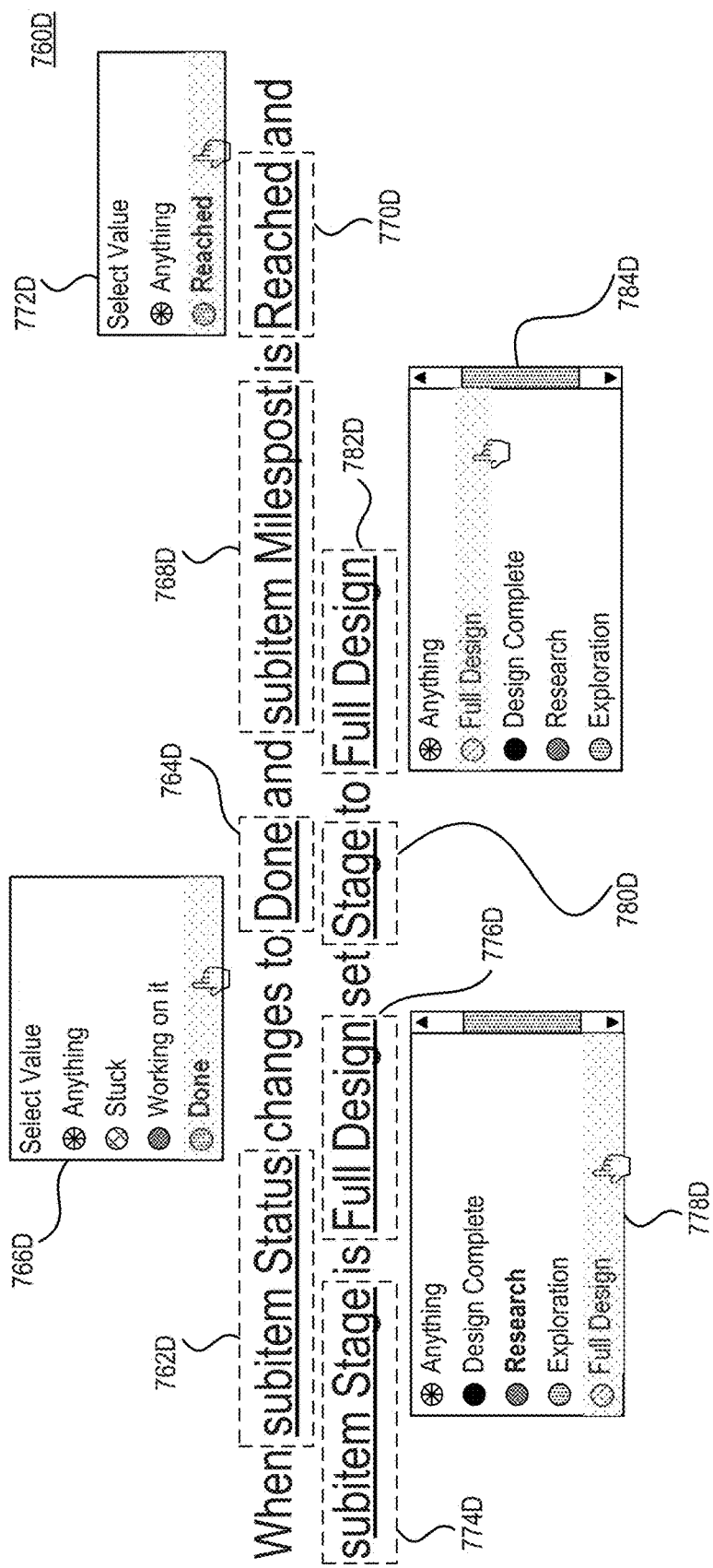
FIG. 7D illustrates a second use case for a specific conditional rule associating the specific first cell with a plurality of second cells, consistent with some embodiments of the present disclosure.

FIG. 7D illustrates a specific conditional rule (associated with the example shown in FIG. 7C) associating the specific first cell of a higher-level table with a plurality of second cells of a lower-level table. As illustrated in FIG. 7D, specific conditional rule 760D may include a conditional statement—"When subitem Status changes to Done and subitem Milepost is Reached and subitem Stage is Full Design set Stage to Full Design." Specific conditional rule 760D may also include triggers and actions similar to the conditional rule 720B of FIG. 7B. Each of the configurable or definable fields 762D, 764D, 768D, 770D, 774D, 776D, 780D, and 782D may be defined by a user in any manner, such as through picklists as shown in FIG. 7D. The pick lists 766D, 772D, 778D, and 784D may be based on information contained in either the higher-level table 740C or lower-level table 746C of FIG. 7C. The specific conditional rule 760D of FIG. 7D may be configured to monitor for qualifying data (e.g., subitems Statuses changing to Done 764D and subitem Milepost is Reached 770D) to cause the specific conditional rule 760D to be triggered and cause an action (e.g., setting Stage to Full Design 782D).

In some embodiments, the at least one processor of the system may carry out operations that may involve receiving qualifying information from each of the plurality of second cells. Qualifying information may refer to any information that meets a threshold or condition, similar to the previous reference to qualifying data. The at least one processor may use the qualifying information in one or more cells of a hierarchical table to determine whether to trigger a conditional rule, as described previously. For example, the at least one processor may receive the qualifying information as a variable declaring the statement "True" or "False" that the qualifying data in each of a plurality of second cells in a lower-level table may meet or not meet the triggers established in a specific conditional rule.

In some embodiments, the at least one processor of the system may carry out operations that may involve upon receipt of the qualifying information from each of the plurality of second cells, triggering the specific conditional rule to thereby update milestone information in the specific first cell of the higher-level table. Updating milestone information may refer to the addition, deletion, rearrangement, or any other modification or combination thereof of information related to a milestone that may be included in a cell of the higher-level or lower-level table. Updating milestone information may occur automatically based on a logical rule associated with a specific conditional rule that monitors conditions and qualifying information (of a lower-level table) that meet those conditions before triggering the update of milestone information in a specific cell of a higher-level table, as previously described above in the exemplary use cases.

In some embodiments, the at least one processor of the system may carry out operations that may involve, wherein prior to updating the specific first cell, the specific first cell being empty and updating may cause the milestone indicator to be added to the specific first cell. A cell being empty may include a cell of a table that does not contain information but may still be a part of other functions such as a conditional rule, as previously discussed. Depending on the conditional rule, qualifying data from the lower-level table may cause the conditional rule to be triggered to cause an update in a specific cell of the higher-level table that was previously empty so that the specific cell then becomes populated with an indication of a milestone of the information associated in the lower-level table.

Figure 8A:
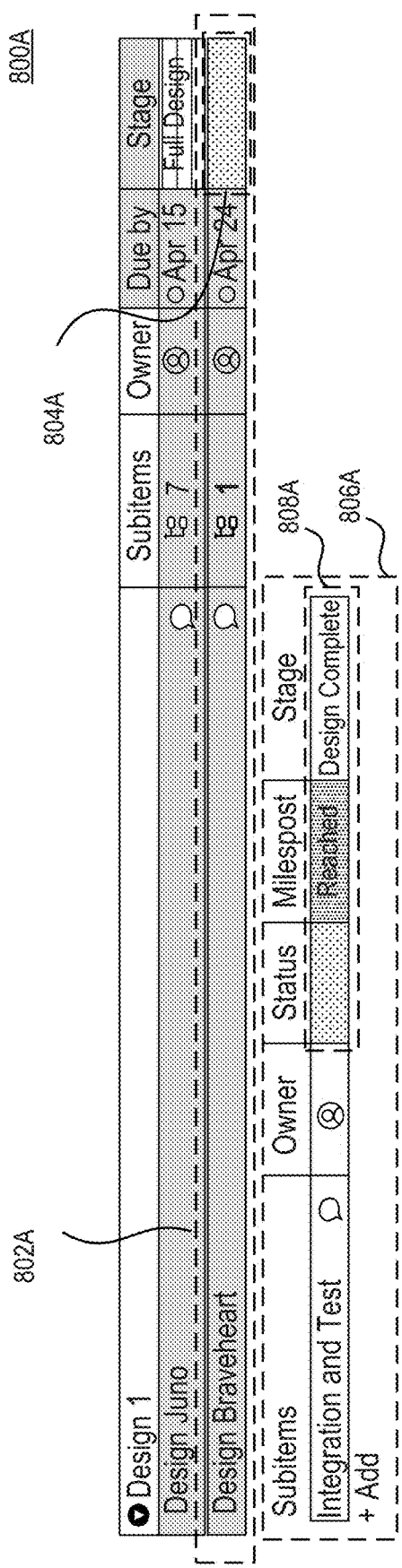
FIGS. 8A & 8B illustrate example views of updating the specific first cell from being empty to having an updated milestone indicator, consistent with some embodiment of the present disclosure.
Figure 8B:
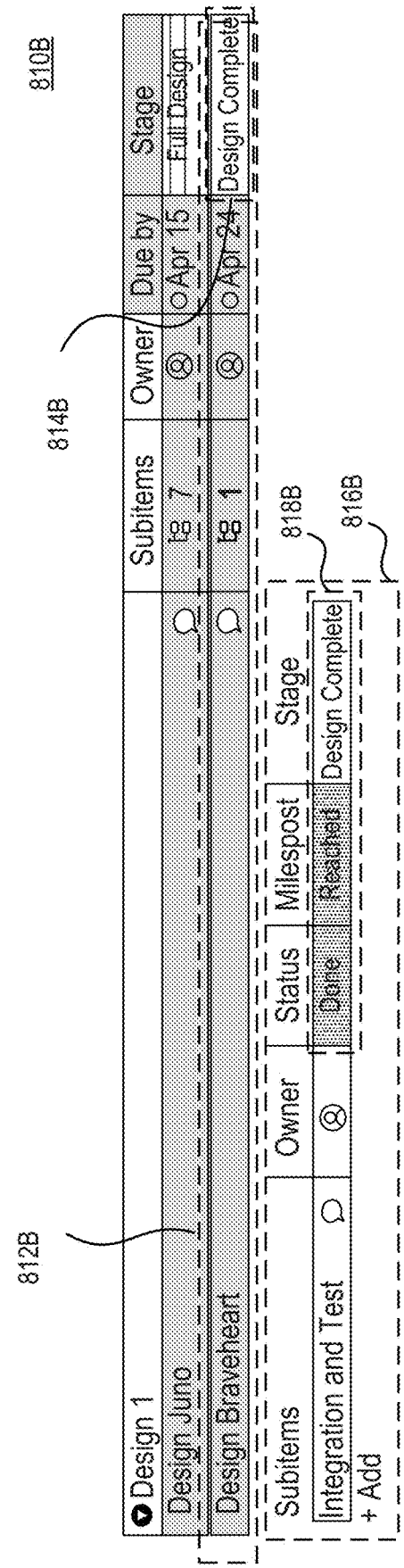

By way of example, FIGS. 8A and 8B illustrate updating the specific first cell from being empty to having an updated milestone indicator, consistent with some embodiments of the present disclosure. As illustrated in FIG. 8A, higher-level table 800A may contain the first row 802A including an empty specific cell 804A to present an indication of information contained in the lower-level table 706A's plurality of cells 808A. The same higher-level table 800B in FIG. 8B may contain the first row 812B including the same specific cell 814B being updated to add the milestone indicator "Design Complete" because the plurality of cells 818B in lower-level table 816B may be the qualifying information for a conditional rule that populated the previously empty cell 804A to be updated with milestone information in updated cell 814B.

In some embodiments, the at least one processor of the system may carry out operations that may involve the specific first cell containing an original milestone indicator and updating may cause the original milestone indicator to be replaced by an updated milestone indicator thereby reflecting progress in a workflow. An original milestone indicator may include any milestone indicator as previously discussed and may be different from an updated milestone indicator. For example, an original milestone indicator may include an indication of "Preliminary Design Stage," and an updated milestone indicator may contain the indication of "Critical Design Stage" that may be updated as a result of a conditional rule being triggered to reflect the progress of a workflow contained in a lower-level table. A workflow may refer to combination of structures such as tasks or activities that may organize a project or any other activity. For example, a workflow may include a sequence of tasks such as a "Research Phase," an "Exploration Phase," a "Full Design Phase," and followed by a "Design Complete Phase." These sequences may represent different milestones in a project configured by a user or may be provided as a preset by the system.

Figures 9A, 9B:
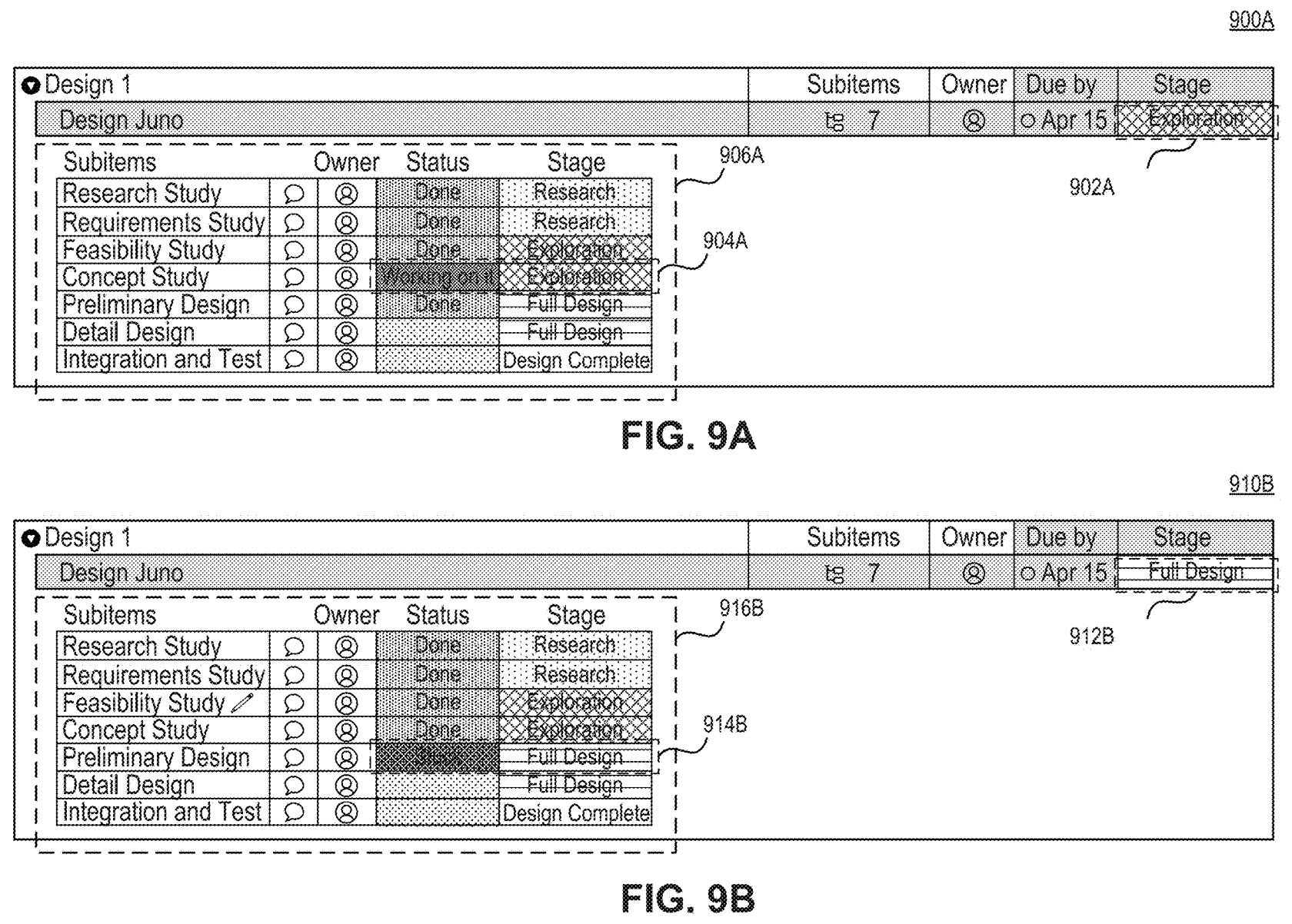

By way of example, FIGS. 9A and 9B illustrate a specific first cell containing an original milestone indicator being replaced by an updated milestone indicator, consistent with some embodiments of the present disclosure. As illustrated in FIG. 9A, the higher-level table 900A may contain the specific cell 902A having the original milestone indicator "Exploration" based on information contained in the plurality of cells 904A in lower-level table 906A. The lower-level table 906A may contain the workflow milestones of "Research," "Exploration," "Full Design," and "Design Complete. FIG. 9B illustrates the same higher-level table 910B containing the same specific cell 912B having an updated milestone indicator "Full Design" being the third task in the workflow due to the status of the information in the plurality of cells 914B in the same lower-level table 916B.

Some embodiments may involve the at least one processor being further configured to cause a lower-level table to be selectively expandable and collapsible on a viewable interface and upon receipt of a collapsing command, may cause the lower-level table to be hidden from view. Selectively expandable and collapsible may refer to the ability or capacity to receive a selection from any interface to display (e.g. expand or make visible) or reduce (e.g., minimize, hide, obfuscate) information from a particular lower-level table. A collapsing command may refer to instructions not limited to pressing or clicking a button by a user to request the at least one processor to collapse the lower-level table such that it may be hidden from view in the viewable interface, as previously described. Being hidden from view may include any reduction of viewability of information, such as a minimization of information, complete removal, or partial reduction in viewability. There may also be an expanding command having instructions not limited to pressing or clicking a button by the user to request the at least one processor to expand the lower-level table such that it may be visible from view in the viewable interface.

Figure 10:
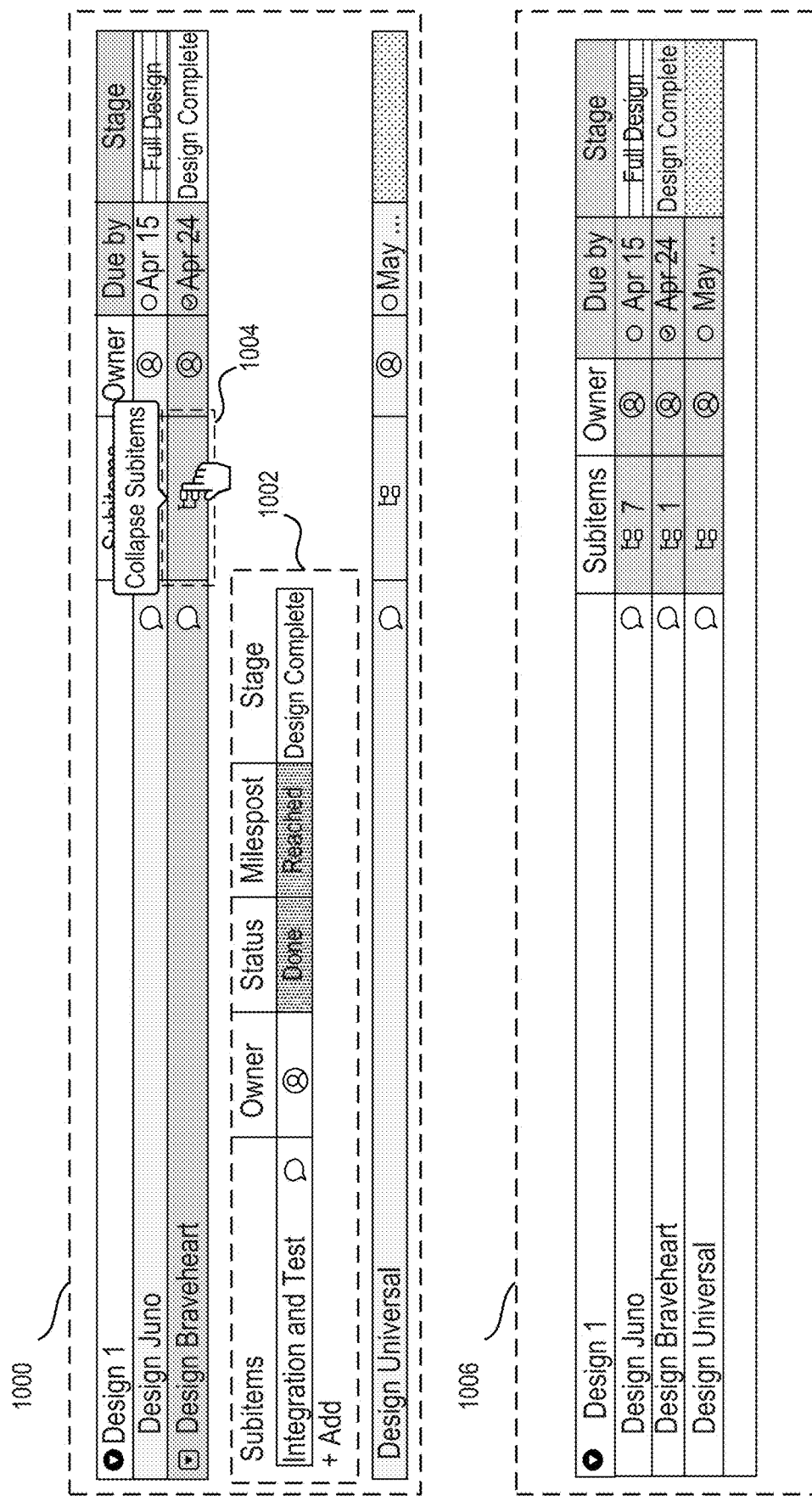
FIG. 10 illustrates example views of the at least one processor selectively expanding or collapsing lower-level table upon receipt of a collapsing command in a viewable interface, consistent with some embodiments of the present disclosure.

FIG. 10 illustrates example views of the at least one processor selectively collapsing lower-level table upon receipt of a collapsing command in a viewable interface, consistent with some embodiments of the present disclosure. As illustrated in FIG. 10, a first view 1000 of the viewable interface may display a lower-level table 1002. The at least one processor may, upon receipt of a collapsing command 1004, collapse the lower-level table 1002 as shown in collapsed view 1006. In the collapsed view 1006 of the same viewable interface, the lower-level table 1002 from the first view may be collapsed such that it may be hidden from view as compared to the first view 1000.

Some embodiments may involve the at least one processor further configured to receive from a rule-builder interface, specific conditions in second cells of the lower-level table that may trigger the milestone update in the first specific cell of the higher-level table. A rule-builder interface may refer to a viewable interface specifically dedicated to forming, establishing, and executing conditional rules. The rule builder-interface may enable the selection of a customized conditional rule or pre-defined conditional rule, enable input for user-definable requirements into a selected conditional rule, enable association of the selected conditional rule to structures in the higher-level and lower-level tables.

Figure 11:
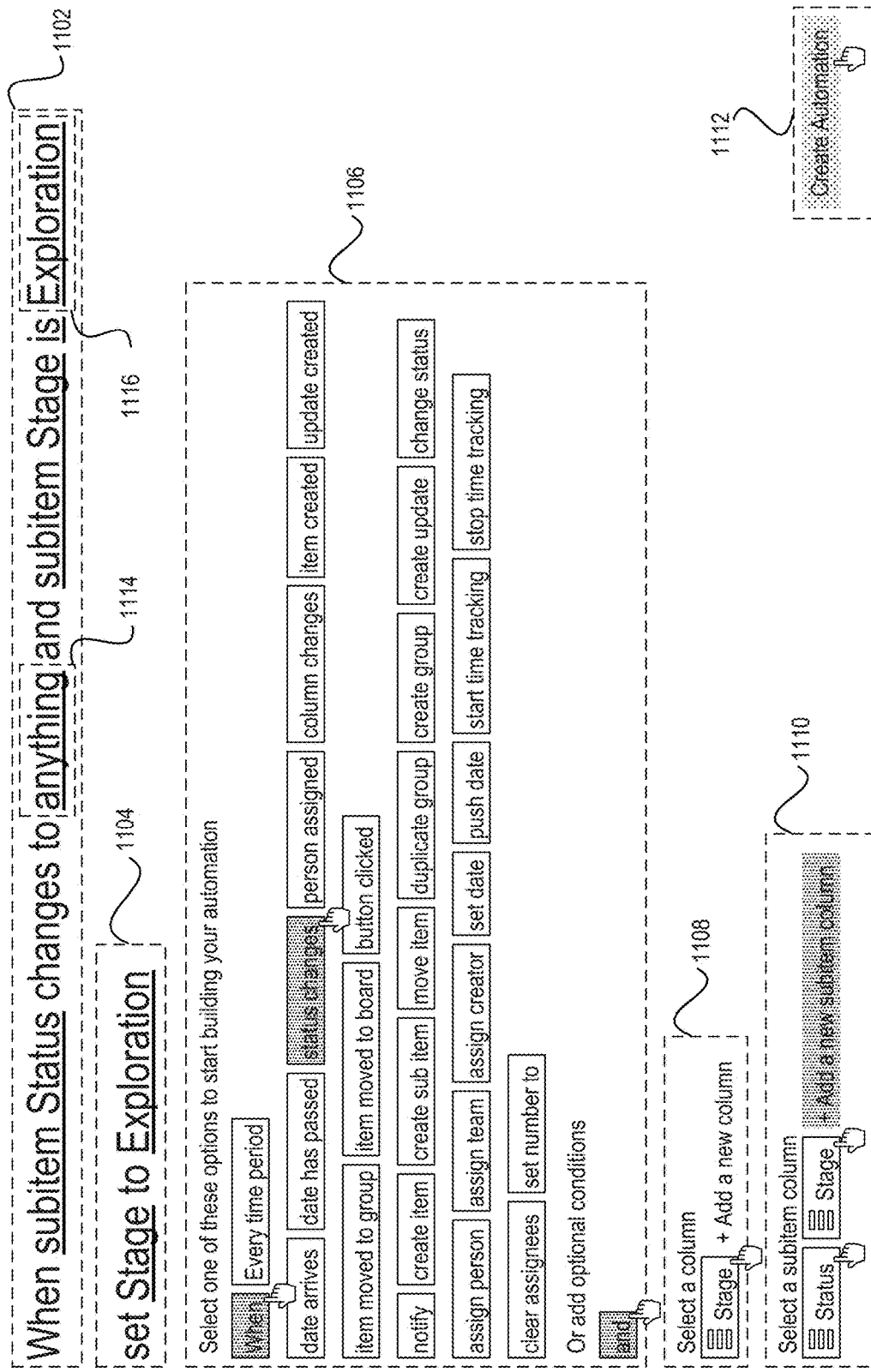
FIG. 11 illustrates an example view of a rule-builder interface having specific conditions in second cells of the lower-level table triggering the milestone update in the first specific cell of the higher-level table, consistent with some embodiments of the present disclosure.

FIG. 11 illustrates an example view of a rule-builder interface having specific conditions in cells of the lower-level table triggering the milestone update in the specific cell of the higher-level table, consistent with some embodiments of the present disclosure. As illustrated in FIG. 11, rule-builder interface 1100 may include a specific conditional rule 760D with a conditional rule trigger 1102, a conditional rule action 1104, pre-defined conditional rule options 1106 from which a user may select to build a conditional rule, specific higher-level conditions 1108 associated with a specific first cell of a higher-level table, specific lower-level conditions 1110 associated with a second cell or a plurality of second cells in the lower-level table, and a button 1112 for finalizing conditional rule for execution. The selection of pre-defined conditional rule options 1106 and the specific lower-level conditions 1110 may generate the conditional rule trigger 1102 associated with the plurality of second cells in "Status" second column 710A and "Stage" second column 712A of FIG. 7A, as described above. Similarly, the selection of pre-defined conditional rule options 1106 and the specific higher-level conditions 1108 may generate the conditional rule action 1104 associated with the specific first cell 704A in "Stage" first column 702A of FIG. 7A. The conditional rule trigger 1102 may trigger a milestone update (e.g., the update of the milestone indicator or qualifying data) of the specific first cell 704A based on the conditional rule action 1104.

Some embodiments may involve the at least one processor being further configured to receive from the rule-builder interface, specific variables for each of the plurality of second cells, to prevent the specific conditional rule to be triggered until each of the specific variables exists in an associated second cell. Specific variables for cells may include any information that may be contained in the cells. A conditional rule may include these specific variables to determine when the conditional rule should be triggered. These variables may be selected in the rule-builder interface to configure the qualifying data that will trigger the conditional rule that may cause a milestone indicator to be updated. For example, the specific variable may contain the qualifying data "Anything," "Done," "Stuck," "Working on it," "Reached," "Research," "Exploration," "Full Design," "Design Complete," or any other indicators or information that may be used to indicate qualifying information as described above.

By way of example, FIG. 11 illustrates the rule-builder interface 1100 having the conditional rule trigger 1102 with "Status" specific variable 1114 having the qualifying data "anything" and "Stage" specific variable 1116 having the qualifying data "Exploration." Unless the "Status" specific variable 1114 and "Stage" specific variable 1116 have their respective variables meet the qualifying data met as configured, the at least one processor may not trigger the conditional rule action 1104 because the qualifying information may not be met.

Some embodiments may involve the at least one processor further configured to store the specific conditional rule as a template for application to additional lower-level tables. Storing a specific conditional rule as a template may include storing a specific conditional rule in memory for later application, such as in a non-transitory computer-readable medium. Once stored in memory, the specific conditional rule may be accessed and reused for additional lower-level tables or even higher-level tables. For example, in another board, the specific conditional rule may be applied to one or more additional lower-level tables associated with one or more higher-level tables without needed to recreate the specific conditional rule in the rule-builder interface from scratch.

Figure 12:
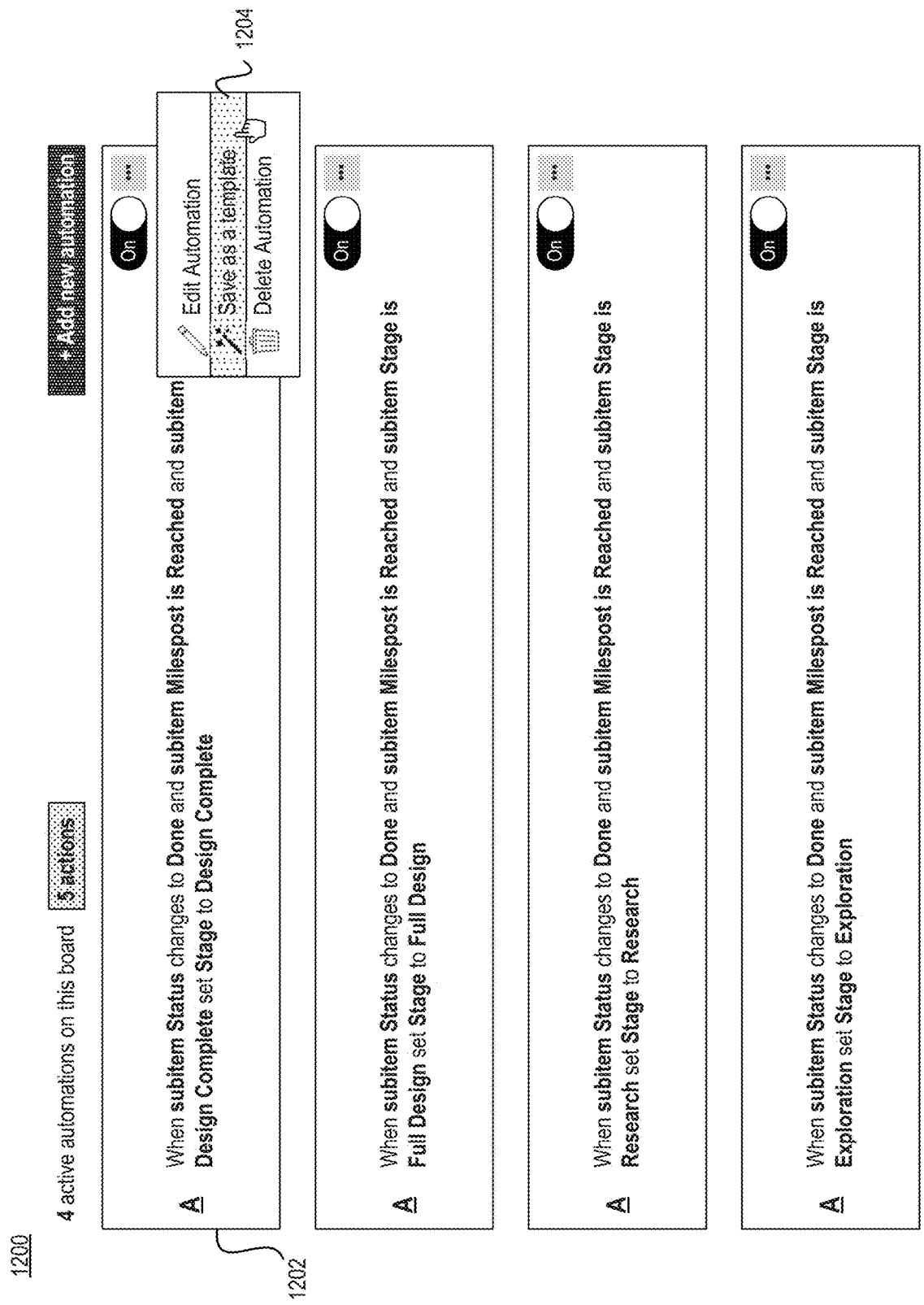
FIG. 12 illustrates the at least one processor storing a specific conditional rule as a template for application to additional lower-level tables, consistent with some embodiments of the present disclosure.

By way of example, FIG. 12 illustrates the at least one processor storing a specific conditional rule as a template for application to additional lower-level tables, consistent with some embodiments of the present disclosure. As illustrated in FIG. 12, rule-builder interface 1200 may include a plurality of conditional rules that may have been generated previously. A user may request that a specific conditional rule 1202 be stored as a template 1204 by the at least one processor for application to any future or additional lower-level tables.

Figure 13:
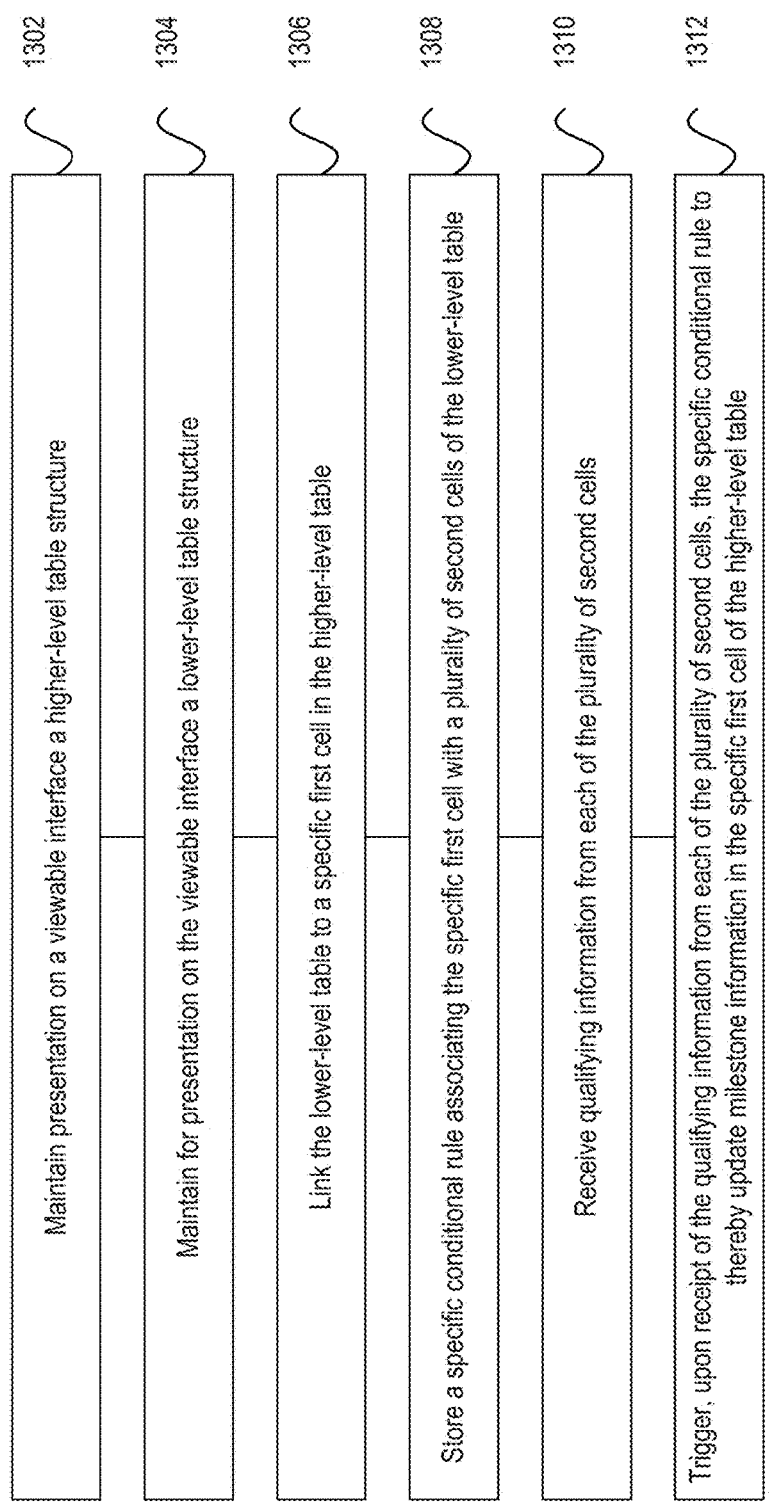
FIG. 13 illustrates exemplary block diagram for an exemplary method for implementing conditional rules in a hierarchical table structure, consistent with some embodiments of the present disclosure.

FIG. 13 illustrates exemplary block diagram for an exemplary method for implementing conditional rules in a hierarchical table structure, consistent with some embodiments of the present disclosure. Method 1300, as shown in FIG. 13, with block 1302 may maintain presentation on a viewable interface a higher-level table structure having first rows, first columns and first cells at intersections of first rows and first columns, as previously discussed. At block 1304, method 1300 may maintain for presentation on the viewable interface a lower-level table structure having second rows, second columns and second cells at intersections of second rows and second columns, as previously discussed. At block 1306, method 1300 link the lower-level table to a specific first cell in the higher-level table, wherein the specific first cell is configured to present a milestone indicator, as previously discussed. At block 1308, method 1300 may store a specific conditional rule associating the specific first cell with a plurality of second cells of the lower-level table, such that entry of qualifying data into each of the plurality of second cells triggers the specific conditional rule to cause a change in the specific first cell of the higher-level table, as previously discussed. At block 1310, method 1300 may receive qualifying information from each of the plurality of second cells, as previously discussed. At block 1312, method 1300 may trigger, upon receipt of the qualifying information from each of the plurality of second cells, the specific conditional rule to thereby update milestone information in the specific first cell of the higher-level table, consistent with the disclosure discussed above.

Some disclosed embodiments may relate to a system for automatic generation of customized lower-level table templates based on data in an associated higher-level table structure. The system may involve at least one processor (e.g., processor, processing circuit or other processing structure described herein) and may be employed in collaborative work systems. Lower-level table templates may refer to one or more temporary or permanent table formats hierarchically arranged beneath a higher level table. The lower-level table template may be organized or positioned into a tree-like structure, a cascade of tables, or an array of tables where the tables may be positioned, located, or embedded into one or more other tables that may be at higher levels. The lower-level table templates may be configured to display data or information in one or more cells, rows, and columns of a table. For example, a lower-level table template may be configured to augment a higher level table by providing back-up information, additional information, and/or information related to the higher level table. Customized lower-level table templates may refer to lower-level table templates capable of being modified, changed, rearranged, reformatted, edited, or any combination thereof individually, in groups, globally, or any combination thereof. Customized templates may have different formats or representations of elements, data, information, and text inside the lower-level tables such that a template change may be reflected in one or more lower-level tables. Furthermore, the customized lower-level table templates may be capable of being modified, such as through the addition or removal of cells, rows, and columns. A higher-level table structure may refer to a table structure—having a plurality of rows, columns, and cells—that may be hierarchically arranged above one or more tables that may be at lower-levels. The higher-level table structure may have the function or characteristic of having one or more tables nested, positioned, located, or embedded beneath a row, a column, or a cell. The higher-level table structure may consist of rows, columns, and cells and may have the function or characteristics of containing data or information that may change, alter, or update the structure or display of data or information in one or more lower-level tables nested or embedded beneath the higher-level table structure. For example, data contained in one or more cells of the higher-level table structure may cause the at least one processor to automatically generate one or more customized lower-level table templates for each row or cells of the higher-level table structure. Each customized lower-level table template associated with higher-level table structure's rows or cells may be the same or different from one another. The data or information in the higher-level table structure may include text, numbers, links, objects, expressions, conditions, or formats, or a combination thereof that the at least one processor may automatically detect to generate customized lower-level table templates.

Figure 14:
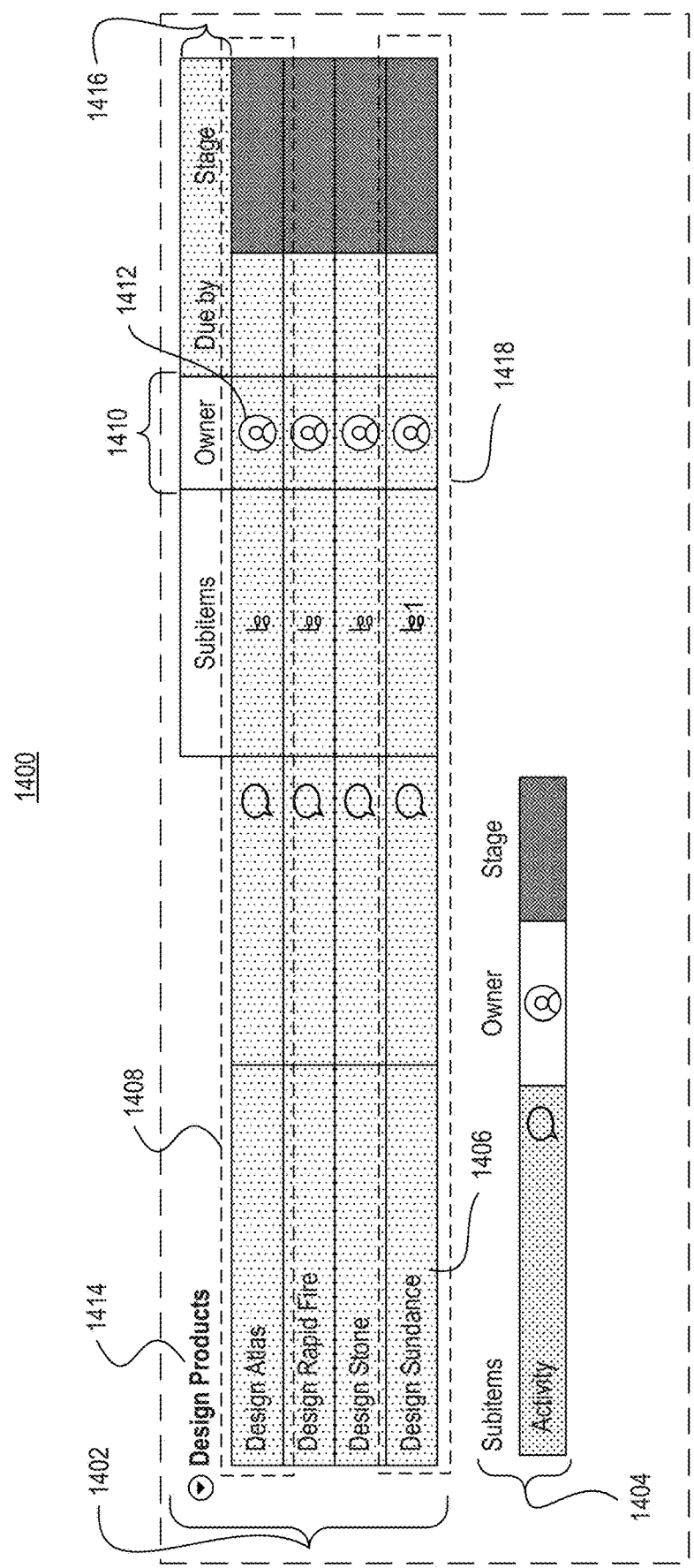
FIG. 14 illustrates an example view of customized lower-level table templates based on data in an associated higher-level table structure, consistent with some embodiments of the present disclosure.

By way of example, FIG. 14 illustrates an example view of customized lower-level table templates based on data in an associated higher-level table structure, consistent with some embodiments of the present disclosure. FIG. 14 may include view 1400 that may include higher-level table structure 1402 having a plurality of rows, columns, and cells. View 1400 may also include a customized lower-level table template 1404 that the at least one processor may position under row 1418 of higher-level table structure 1402. The at least one processor may automatically generate the customized lower-level table template 1404 based on the data contained in the "Design Sundance" cell 1406.

Disclosed embodiments may involve maintaining the higher-level table structure having first rows, first columns, and first cells at intersections of first rows and first columns, wherein the first cells may be configured to hold values, and wherein the higher-level table structure may exhibit a plurality of characteristics including at least two of a table type, a table grouping, table content, a table size, a particular column heading, a particular item label, or an author. Maintaining a table structure may involve storing a template in memory. In another sense, maintaining a table structure may involve storing in a data structure information keyed to columns, rows, and/or cells in a table. The values in first cells may refer to data such as text, numbers, expressions, conditions, objects, links, formats, or a combination thereof, as described above. A plurality of characteristics of a table (e.g., higher-level or lower-level) may refer to one or more values, traits, entities, relationships, associations, patterns, indicators, or any combination thereof. These characteristics may include one or more of a table type, table grouping, table content, table size, particular column headings, particular item labels, or authors. For example, table characteristics may include table type, table grouping, table content, table size, particular column heading, particular item label, or an author. Each higher level table may exhibit at least two of these characteristics.

A table type may refer to a category, classification, design, purpose, or description of a table. Differing tables may track differing types of items. For example, a real estate company may have a first type of table that it uses to track rentals of properties, a second type of table used to track sales of properties, and a third type of table used to track property renovations. Table grouping may refer to the collective or set arrangement into a unit of the combination of one or more higher-level tables, one or more lower-level tables, or any combination thereof. The table grouping may be used by the at least one processor as an object to assign data or information associated with the higher-level table structure, the lower-level table, or any combination thereof. Table content may refer to the values or data contained in the first cells of the higher-level table structure or the lower-level table. The table content may be used by the at least one processor as an object to assign data or information associated with the higher-level table structure, lower-level table, or any combination thereof. Table size may refer to the overall or individual dimensions or magnitude—big or small—of the first rows, the first columns, the first cells, and the higher-level table structure or the lower-level table. The table size may be used by the at least one processor as an object to assign data or information associated with the higher-level table structure, lower-level table, or any combination thereof. A particular column heading may refer to a value descriptive of information in an associated column. The particular column heading may be used by the at least one processor as an object to assign data or information associated with the higher-level table structure, lower-level table, or any combination thereof. A particular item label may refer to values characterizing or being associated with data in rows, columns, cells. The particular item label may also refer to a title associated with a table grouping or row. The particular item label may be used by the at least one processor as an object to assign data or information associated with the higher-level table structure, lower-level table, or any combination thereof. An author may refer to the owner, assignee, assignor, or creator of tasks, activities, assignments, or a combination thereof in a higher-level table or a lower-level table. The author may be a value or data in cells, rows, or columns. The author may be used by the at least one processor as an object to assign data or information associated with the higher-level table structure, lower-level table, or any combination thereof. The plurality of characteristics may be used by the at least one processor as an object to assign data or information associated with the higher-level table structure, lower-level table, or any combination thereof. For example, the higher-level table structure may consist a plurality of rows, a plurality of columns, and a plurality of cells. First cells may be at the intersection of first rows and first columns.

If, for example, a higher-level table structure has a plurality of characteristics such as three groupings of items, and two particular column headings (e.g., "Stage" and Status"), the system may identify these characteristics for further analysis. The system may analyze other characteristics of the higher-level table structure such as a particular item label (e.g., an item heading labeled as "Real Estate Property 1") or author.

By way of example with reference to FIG. 1, the system may maintain an object (e.g., a higher-level table structure) by storing it in memory 120, in storage 130, or in both. FIG. 14 illustrates an example of higher-level table structure 1402 having a first row 1408, a first column 1410, and a first cell 1412 at the intersection of the first row 1408 and the first column 1410. The higher-level table structure 1402 may exhibit, as plurality of characteristics, a single table grouping 1414, four particular column headings 1416—"Sub-items," "Owner," "Due by," and "Stage"—, a particular item label 1406 having a value "Design Sundance," and an author 1412.

Consistent with disclosed embodiments, a least one processor of the system may carry out operation that may involve receiving an input for triggering generation of a lower-level table template tied to the higher-level table structure. An input for triggering generation of a lower-level table template may refer to an action by a user to cause, induce, or trigger at least one processor to generate a lower-level table template tied or associated with one or more first cells in the higher-level table structure. In some instances, the addition of data to a higher-level table may trigger formation of a lower-level table. In other instances, a lower-level table may be established in response to a specific request of a user. In yet other instances, the lower-level template might automatically be associated with a higher-level table template through design or configuration of the system. The input for triggering a lower-level template may include a change in one or more values in the first cells, particular column headings, particular item labels, or any combination or singular change in the higher-level table. In addition, the input for triggering may be a change in the table size, the table type, the table grouping, the table content, a particular item label, the particular column heading, author, or any combination thereof. The lower-level template may or may not be represented or displayed, and the at least one processor may store the lower-level template in the memory of the system. For example, the at least one processor may detect that a value in a particular item label in the higher-level table structure may have changed, which may trigger the generation of the lower-level table template. In another example, the at least one processor may detect the addition of a particular column heading and author in the higher-level table structure, which may trigger the generation of the lower-level table template.

Some disclosed embodiments may involve triggering a lower-level table structure as a result of activation of a button. Activation of a button may refer to a user pressing, touching, or clicking a button (actual or virtual) to request the at least one processor to generate the lower-level table template that may be tied to the higher-level table structure.

Figure 15:
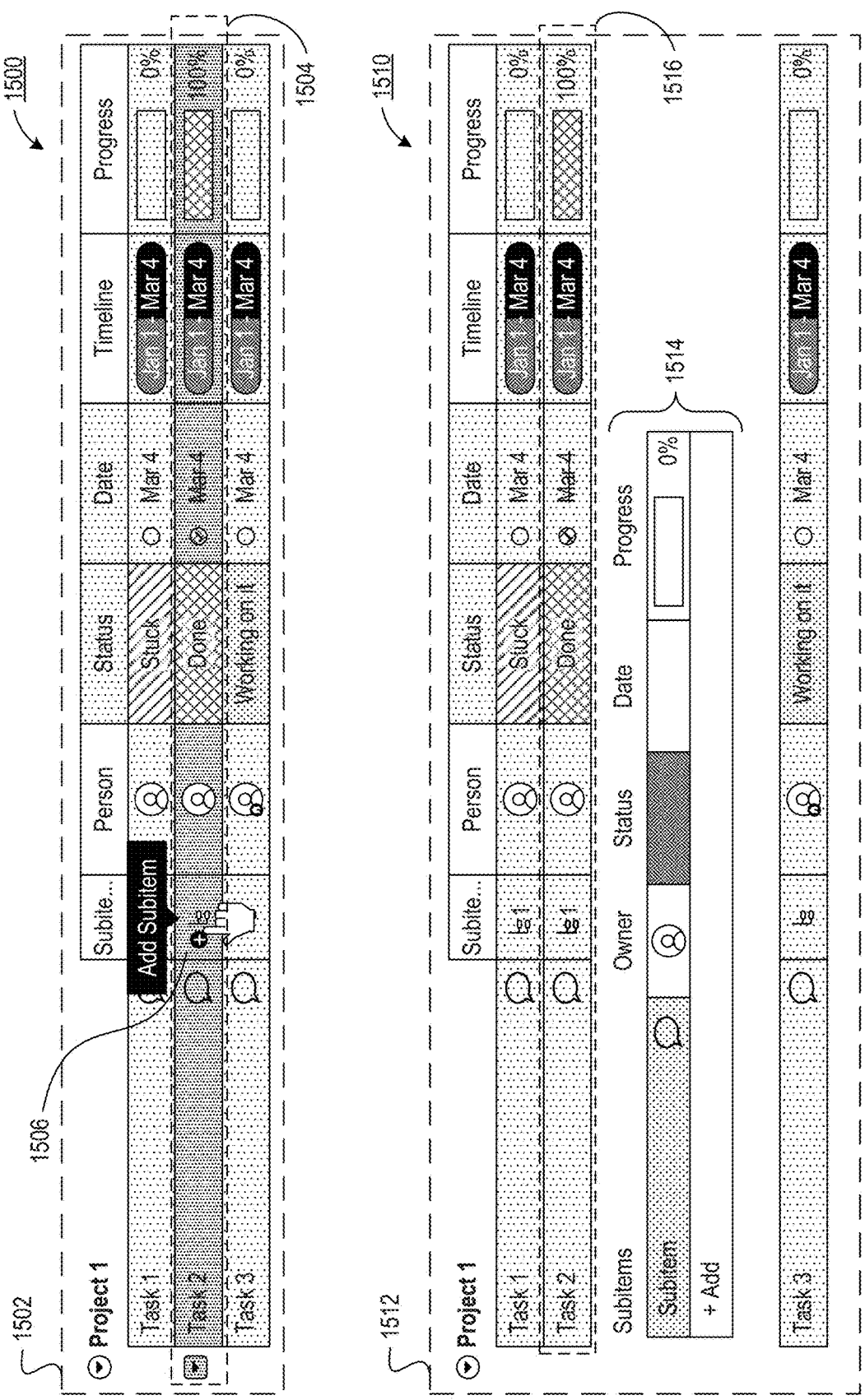
FIG. 15 illustrates examples views of receiving an input for triggering the generation of a lower-level table template tied to the higher-level table structure, consistent with some embodiments of the present disclosure.

By way of example, the at least one processor may store lower-level table template in the memory 120 in FIG. 1, the storage 130 in FIG. 1, or both. FIG. 15 illustrates examples views of receiving an input for triggering the generation of a lower-level table template tied to the higher-level table structure, consistent with some embodiments of the present disclosure. FIG. 15 illustrates a first view 1500 having a higher-level table structure 1502 with a first row 1504. A user may provide the input by clicking on the first cell 1506 that may trigger the at least one processor to generate a lower-level table template 1514 in a second view 1510 or in memory, or any combination thereof. The lower-level table template 1514 may be tied to a first row 1516 of a higher-level table structure 1512 in the second view 1510. A lower-level table can be customized to suit the needs of users, and there is no hard and fast structure required. In the instant example, a first row 1516 of the lower-level table structure 1512 may be a repetition of a first row 1504 of the higher-level table structure 1502. The lower-level table template 1514 may not be automatically displayed in second view 1510, and may be retrieved from the system's memory when a user calls for it (such as b clicking click the first cell 1506 in the first view 1500).

Disclosed embodiments may also involve analyzing at least one higher-level table characteristic including higher-level table type, higher-level table grouping, higher-level table content, higher-level table size, higher-level particular column heading, higher-level particular item label, or higher-level author. For example, the at least one processor may analyze one or more of the higher-level table characteristics previously described in order to determine a context for use in selecting a lower-level table. Analysis may include examining the characteristics identified and/or metadata associated with the characteristics to aid in lower-level table structure selection. For example, each specific author may have their own preferred lower-level templates. Therefore, analyzing author may facilitate lower-level table structure selection. By way of another example, lower-level tables may differ based on the table type of the upper-level table. In such instances, analyzing the table type of the higher-level table may facilitate selection of the lower-level table structure template. Similarly, differing groupings of items may each have their own associated lower-level template structure. In such instances, analyzing the grouping to identify it may facilitate lower-level template selection. By way of yet another example, analyzing table content, such as through semantic analysis, may identify a correlation between the content and a lower-level table structure template. In a further example, a larger table may typically be associated with a differing lower-level template than a smaller table. Analyzing the table size may therefore facilitate lower-level table template selection. Similarly, since row/item and column headings may indicate a data type, and the data type may correlate to preferred lower-level table structure templates, analysis of the row/item and column headings may be useful in lower-level table template selection. The analysis may be performed by at least one processor acting on information stored in the memory 120 in FIG. 1, the storage 130 in FIG. 1, or both. The analysis may involve the use of artificial intelligence/machine learning as previously discussed.

Some embodiments may involve, based on the input and the analysis, determining a customization of the lower-level table template, the customization including at least one of a lower-level column heading or a lower-level row heading. A customization of the lower-level table template may refer to selection and/or customization of a lower level template from a group of pre-existing lower-level templates. A customization may also include a complete or partial construction of a new lower-level template. In either instance, the customization may include a least one column or row heading. The column or row heading may correspond to or otherwise relate to information in an associated higher-level table. At least one processor may access a lower-level table template in memory to perform changes or alterations in the format, color, size, values, data or information, or any combination thereof of the rows, columns, or cells of the lower-level table template. A lower-level column heading may refer to a label or other indicator associated with a column. The lower-level column heading may be unique to the lower-level table template or may be the same as or similar to an associated higher-level particular column heading. The lower level heading may alternatively be, unique to the lower-level table template. A lower-level row heading may refer to a label or other indicator associated with one or more rows in a table. The lower-level row heading may be unique to the lower-level table template. The customization of the lower-level table template may include an addition, subtraction, rearrangement, change, alteration, or any combination thereof of the lower-level column heading or the lower-level row heading. For example, the at least one processor may access its memory to determine the customization of the lower-level table template based on an analysis or evaluation of at least one higher-level table characteristic. In another example, the at least one processor may determine the customization of the lower-level table template based on the input in the higher-level table structure. The input, as described above, may be a change in one or more higher-level values in the first cells, column heading, item label, table size, table type, table grouping, table content, activation of a button, or any combination thereof. In yet another example, the at least one processor may simultaneously determine the customization of the lower-level table template based on both the input and the analysis in the higher-level table structure. The at least one processor may continuously analyze and evaluate inputs triggering the generation of one or more lower-level table templates to determine the customization of the lower-level table templates.

Figure 16:
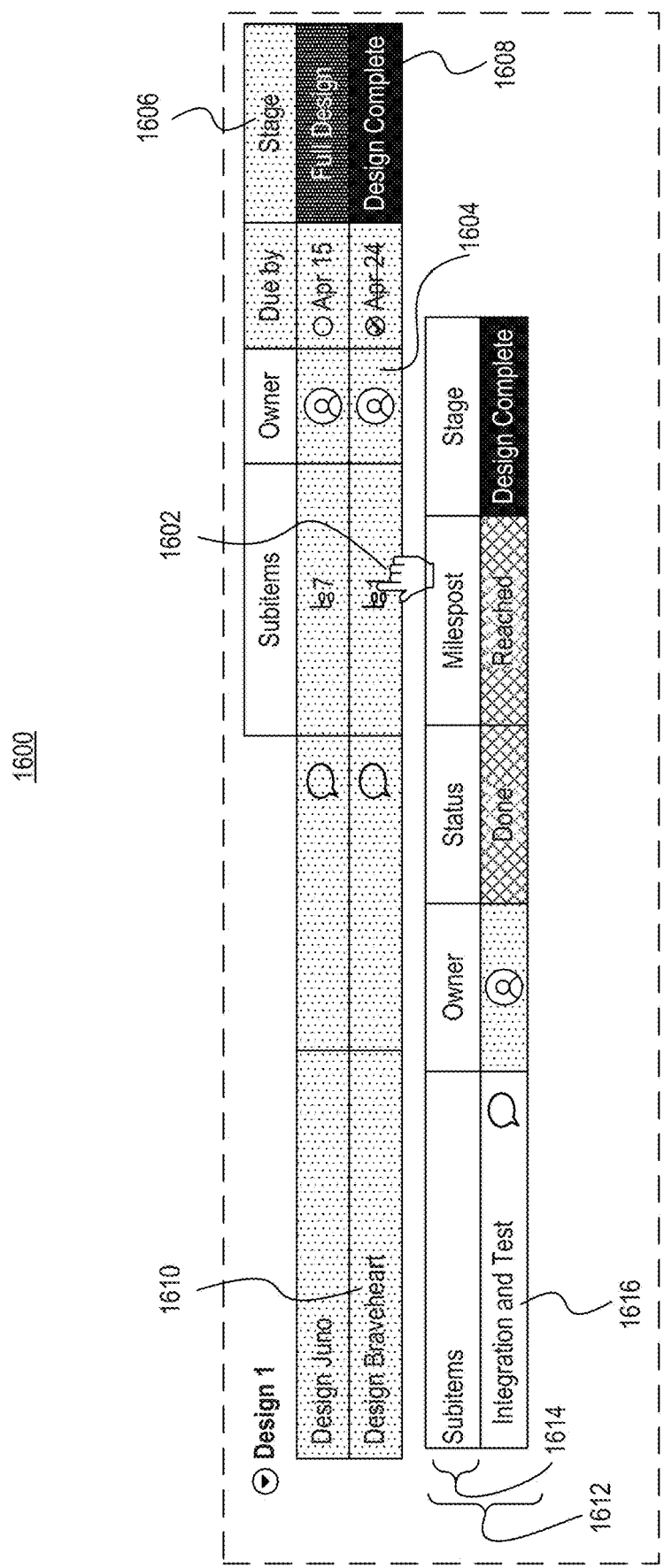
FIG. 16 illustrates determining a customization of the lower-level table template based on the input and the analysis by the at least one processor, consistent with some embodiments of the present disclosure.

By way of example, FIG. 16 illustrates a customization of a lower-level table template based on the input and the analysis by at least one processor, consistent with some embodiments of the present disclosure. As illustrated in FIG. 16, the at least one processor may receive an input 1602 in higher-level table structure 1600 triggering the generation of a lower-level table template in memory 120, storage 130, or both (as illustrated in FIG. 1). Furthermore, the at least one processor may analyze a higher-level author 1604 in a first cell to obtain the lower-level table template associated with the higher-level author 1604. Moreover, the at least one processor may analyze the value of a higher-level particular column heading 1606—"Stage"—, the value of a first higher-level particular item label 1608—"Design Complete"—in a first cell, and the value of a second higher-level particular item label 1610—"Design Braveheart"—to determine a customization of the lower-level table template 1612. The at least one processor may thereafter determine the lower-level column heading 1614—"Owner," "Status," "Milestone," and "Stage"—based on the higher-level author 1604, the higher-level particular column heading 1606, and the first higher-level particular item label 1608. In addition, the at least one processor may determine a row heading 1616—"Integration and Test"—based on the value of the second higher-level item label 1610.

Disclosed embodiments may also involve associating the customization with the lower-level table template to form a customized lower-level table structure. As discussed above, the lower-level table structure may include one or more rows, columns, and cells at the intersections of the rows and columns. Based on the analysis described above, at least one processor may determine the appropriate (e.g., best fit) lower level table template in order to define the structure of the associated lower-level table. This may include, for example, inserting appropriate column and row headings into the template. By either selecting a template from a group of predefined templates, customizing a template from a group, or building a customized lower-level table from scratch, the system may be said to form a customized lower-level table structure.

Figure 17:
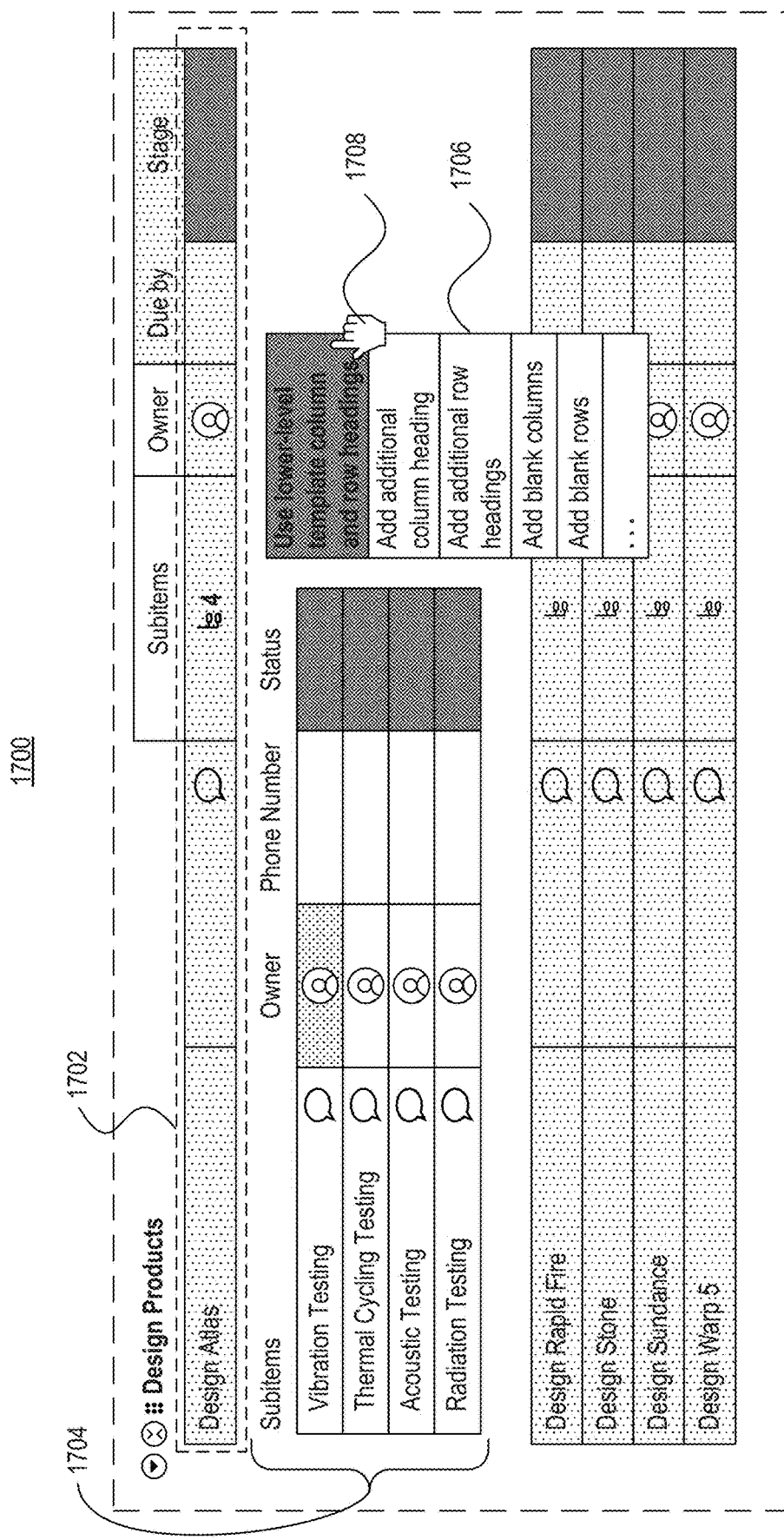
FIG. 17 illustrates associating the customization with the lower-level table template to form a customized lower-level table structure, consistent with some embodiments of the present disclosure.

By way of example, FIG. 17 illustrates associating the customization with the lower-level table template to form a customized lower-level table structure, consistent with some embodiments of the present disclosure. As illustrated in FIG. 17, a higher-level table structure 1700 with first rows 1702 may include one or more values associated with the at least one higher-level table characteristics. The at least one processor may perform a customization of a lower-level table template as previously described to form a customized lower-level table structure 1704 having a plurality of cells, columns, cells, lower-level column headings—"Owner," "Phone Number," "Status—, and lower-level row headings—"Vibration Testing," "Thermal Cycling Testing," "Acoustic Testing," and "Radiation Testing." This may occur after the processor analyzes the table type and recognizes the words "design products" and "Atlas." Applying artificial intelligence, the system may realize that the higher-level table relates to a design of a product, and based on lower-level tables associated with other design projects, populates a lower-level table with the types of testing typically associated with design projects.

Some embodiments may involve presenting options for lower-level template structure and receiving a selection in response. As an alternative to the system picking the row headings, for example, the system may present to the user options for selection. That is, the system may provide a pick list or other form of display that permits a user to select appropriate elements for a lower-level table. In FIG. 17, the various types of testing may be presented to the user, and the user may decide to use some and not others. For example, if the Atlas project does not involve radiation, the user might opt not to select the radiation testing row heading. The presentation may occur in the form of a list menu, a drop-down menu, a visual representation of multiple lower-level template structures in an array, tabs containing each lower-level template structure, or any combination thereof on a graphical user interface to alter, change, add, subtract, rearrange, reformat, resize, change color, or a combination thereof the lower-level template structure. The at least one processor may independently provide a plurality of options for a plurality of lower-level template structures based on the customization of the lower-level template. The at least one processor may receive a selection in response. Such a selection may come from a user. For example, the at least one processor may display a plurality of views in an array on a graphical user interface of one or more lower-level template structures that a user may select from. Furthermore, the at least one processor may store the selected lower-level template structure for use in a lower-level table structure.

By way of another example, FIG. 17 illustrates example lower-level template structure 1704. In addition, the at least one processor may make the lower-level template structure viewable to a user on a graphical user interface. The at least one processor may present to a user a drop-down menu 1706 listing a variety of options to change the lower-level template structure 1704. The user may select an option 1708 to cause the at least one processor to dynamically change a representation or rendering of the lower-level template structure 1704 according to the user's selection. Furthermore, the user may select one or more options from the drop-down menu 1706 to cause the at least one processor to dynamically change the representation or rendering of the lower-level template structure 1704.

Some disclosed embodiments may involve causing a lower-level table structure to be displayed in association with the higher-level table structure. Causing the lower-level table structure to be displayed in association with the higher-level table structure may involve the at least one processor simultaneously displaying on a graphical user interface both the lower-level table structure and the higher-level table structure. A lower-level table structure may include a structure, but in some instances may also include default values in the cells of the structure. For example, a lower-level table structure may be displayed in association with a higher-level table structure as a blank structure, as a structure containing some data or information such as default values in cells, or may in some instances be fully populated with default values.

By way of example, FIG. 17 illustrates higher-level table structure 1700 and the lower-level table structure 1704 being simultaneously displayed on a graphical user interface by the at least one processor.

Disclosed embodiments may further involve determining when conditions in the higher-level table structure may meet a criterion for automatically generating a lower-level table structure, and wherein the input may occur as a result of the determination that the criterion may be met. Conditions in the higher-level table structure may refer to events or triggers associated at least one higher-level characteristic of the higher-level table structure that may cause the at least one processor to recognize, store, or flag one or more values in the at least one higher-level characteristic. Meeting a criterion may refer to a predetermined value being input in a table or a conditional change occurring in a table. Automatically generating a lower-level table structure may refer to the at least one processor independently creating or generating the lower-level table structure in memory or for display on a graphical user interface. The input may occur as a result of the determination that the criterion may be met. For example, a processor might recognize that the conditions in the higher-level table structure may have met a criterion based on an input, as discussed above. For instance, upon recognition that for a specific higher-level author a particular higher-level column heading becomes equal to "Stage," the at least one processor may automatically generate a lower-level table structure with a plurality of empty cells and specific column headings—"Owner," "Status," and "Stage."

FIG. 16 illustrates an example view of the lower-level table structure 1612 generated based the higher-level item label 1610 having the value "Design Braveheart." The lower-level table structure 1612 may include specific column headings 1614 and a plurality of cells.

Some embodiments may involve determining a customization of a plurality of differing lower-level table structures depending on specific characteristics of the higher-level table structure. For example, the at least one processor may recognize a value in a specific higher-level item label to cause a customization adding a specific lower-level column heading to all lower-level table structures, where the added heading is associated with a plurality of first rows in the higher-level table structure.

Figure 18:
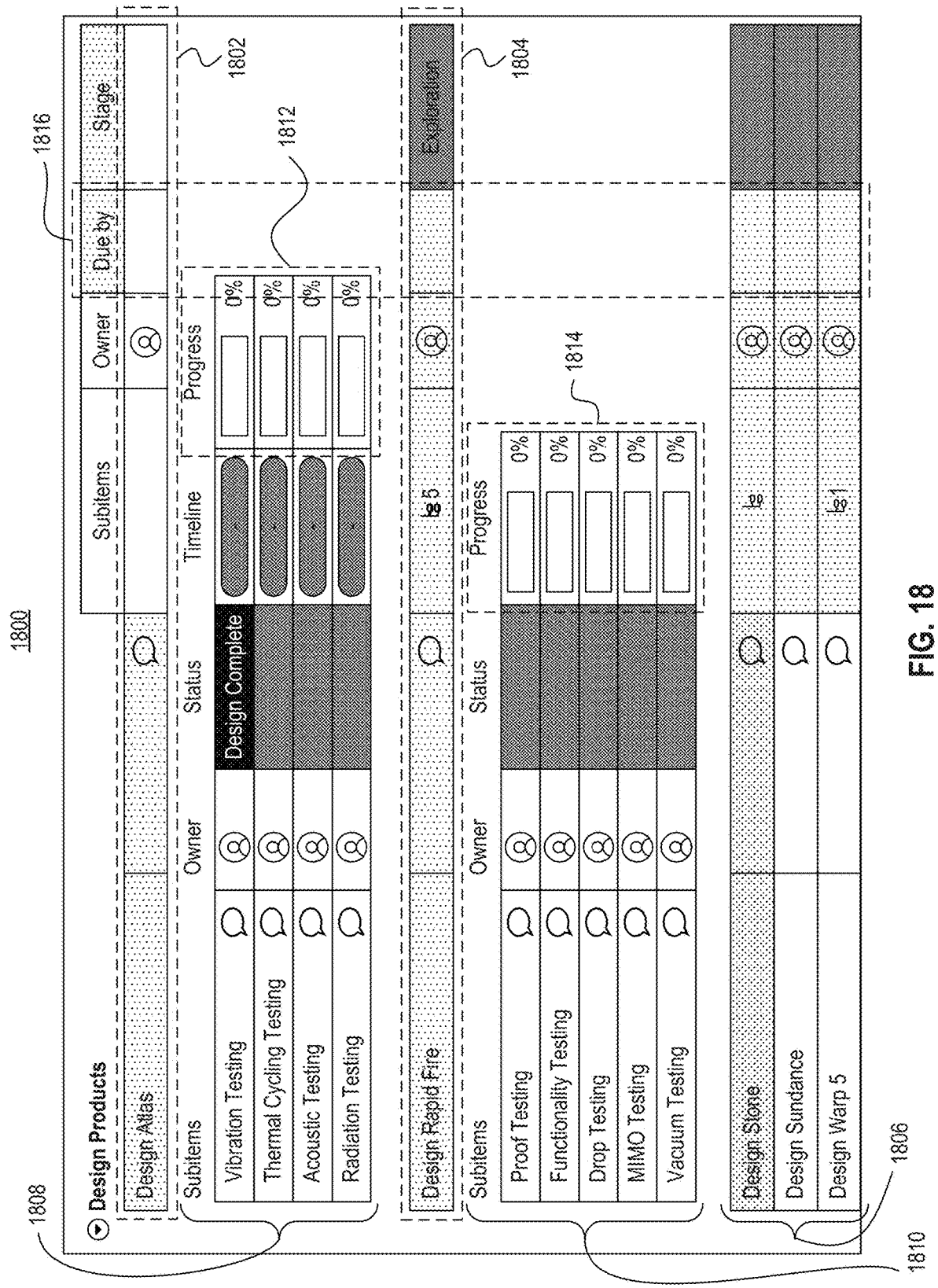
FIG. 18 illustrates a customization of a plurality of differing lower-level table structures depending on specific characteristics of the higher-level table structure, consistent with some embodiments of the present disclosure.

By way of example, FIG. 18 illustrates a customization of a plurality of differing lower-level table structures depending on specific characteristics of the higher-level table structure, consistent with some embodiments of the present disclosure. FIG. 18 includes a higher-level table structure 1800 having a first row 1802, a second row 1804, and other rows 1806. The first row 1802 may include a first associated lower-level table structure 1808, and the second row 1804 may include a second associated lower-level table structure 1810. Because the first row 1802 includes a characteristic of an item heading labeled "Design Atlas," the system may recognize the meaning of that heading and provide a lower-level table structure 1808 with characteristics associated with the recognized heading. In this instance, the system determined that a "Timeline" column 1812 was relevant to the "Design Atlas" project. In contrast, because the second row 1804 of the higher-level table 1800 includes a different characteristic (i.e., "Design Rapid Fire') the system may recognize the meaning of that heading and provide a lower-level table structure 1814 with differing characteristics (in this instance an absence of a timeline column).

Some disclosed embodiments may involve receiving an instruction for triggering generation of a sub-lower-level table template that may be tied to the lower-level table structure; analyzing at least one lower-level table characteristic, including lower-level table type, lower-level table grouping, lower-level table content, lower-level table size, lower-level particular column heading, lower-level particular item label, or lower-level author; based on the instruction and at least one of the higher-level table characteristic and the lower lower-level table characteristic, determining a customization of the sub-lower-level table template, the sub-lower lower-level customization including at least one of a sub-lower-level column heading or a sub-lower-level row heading; associating the customization of the sub-lower-level table template with the sub-lower-level table template to form a customized sub-lower-level table structure; and causing the sub-lower-level table structure to be displayed in association with the lower-level table structure. Just as a lower-level table structure hierarchically appears beneath a higher-higher level table structure, so too does a sub-lower level table structure appear beneath a lower-level table structure. Indeed, the earlier description of generating a lower-level table structure corresponds to generation of a sub-lower-level table structure, and therefore to avoid repetition, that description is invoked here. As with the higher and lower pairing, the instruction for the lower and sub-lower pairing may be the input that the at least one processor may receive.

At least one processor may receive an instruction such as the activation of a button to generate a sub-lower-level table template; the at least one processor may detect one or more values in both the at least one higher-level table characteristic and the at least one lower-level table characteristic to generate the sub-lower-level table template; or the at least one processor may receive instructions and detect one or more values in the at least one higher-level table characteristic and the at least one lower-level table characteristic to generate the sub-lower-level table template. The values detected may be a higher-level particular column heading combined with the lower-level author and lower-level content. Alternatively, the values detected may be a higher-level table content, a higher-level table size, a lower-level type, a lower-level table grouping, and a lower-level author. Furthermore, the at least one processor may determine a customization of the sub-lower-level table template where two sub-lower-level column headings and five sub-lower-level row headings may be added. Moreover, the at least one processor may apply the customization of the sub-lower-level table template to provide one or more customized sub-lower-level table structures for a user to select from. The at least one processor may simultaneously display on a graphical user interface both the lower-level table structure and the sub-lower-level table structure based on the selection in the one or more customized sub-lower-level table structures.

Figure 19:
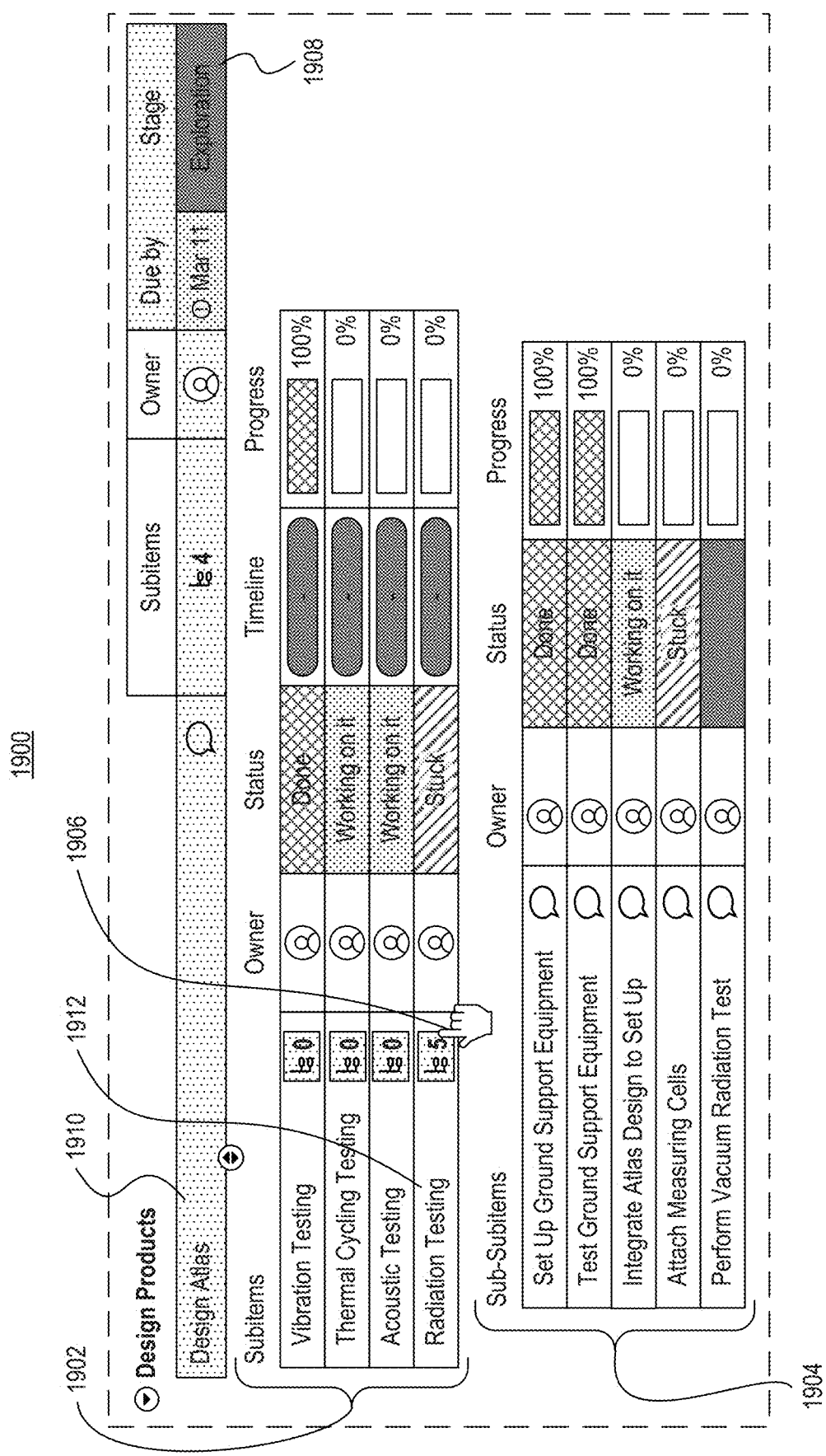
FIG. 19 illustrates the simultaneous display of a higher-level table structure, a lower-level table structure, and a sub-lower-level table structure based on instruction, at least one higher-level table characteristic and a lower-level characteristic, consistent with some embodiments of the present disclosure.

By way of example, FIG. 19 illustrates the simultaneous display of a higher-level table structure 1900, a lower-level table structure 1902, and a sub-lower-level table structure 1904. At least one processor may receive an instruction to generate the sub-lower-level table structure in response to a user pressing button 1906. In addition, the at least one processor may determine a customization of the sub-lower-level table template based on the user pressing button 1906, a first higher-level particular item label 1908, a second higher-level particular item label 1910, and a lower-level particular item label 1912. The first higher-level particular item label 1908 and the second higher-level particular item label 1910 may be the at least one higher-level table characteristic. In addition, the lower-level particular item label 1912 may be the at least one lower-level table characteristic. The at least one processor may associate the customization of the sub-lower-level table template with the sub-lower-level table structure 1904 for simultaneous display with the lower-level table structure 1902.

Some disclosed embodiments may involve storing the lower-level template structure for use with a later-developed higher-level table structure clone. The lower-level template structure may be stored in memory, storage, or the combination thereof. A later-developed higher-level table structure clone may refer to a copy or an identical representation of the higher-level table structure including all lower-level table templates, customization of the lower-level templates, customized lower-level table structures, and lower-level table structures associated with the higher-level table structure. For example, the at least one processor may store the higher-level table structure associated with a board, as discussed above, as a copy in memory, storage, or the combination thereof for later implementation or application to another board of the system or platform. The later-developed higher-level table structure may be customized according to instructions received by the at least one processor.

Figure 20:
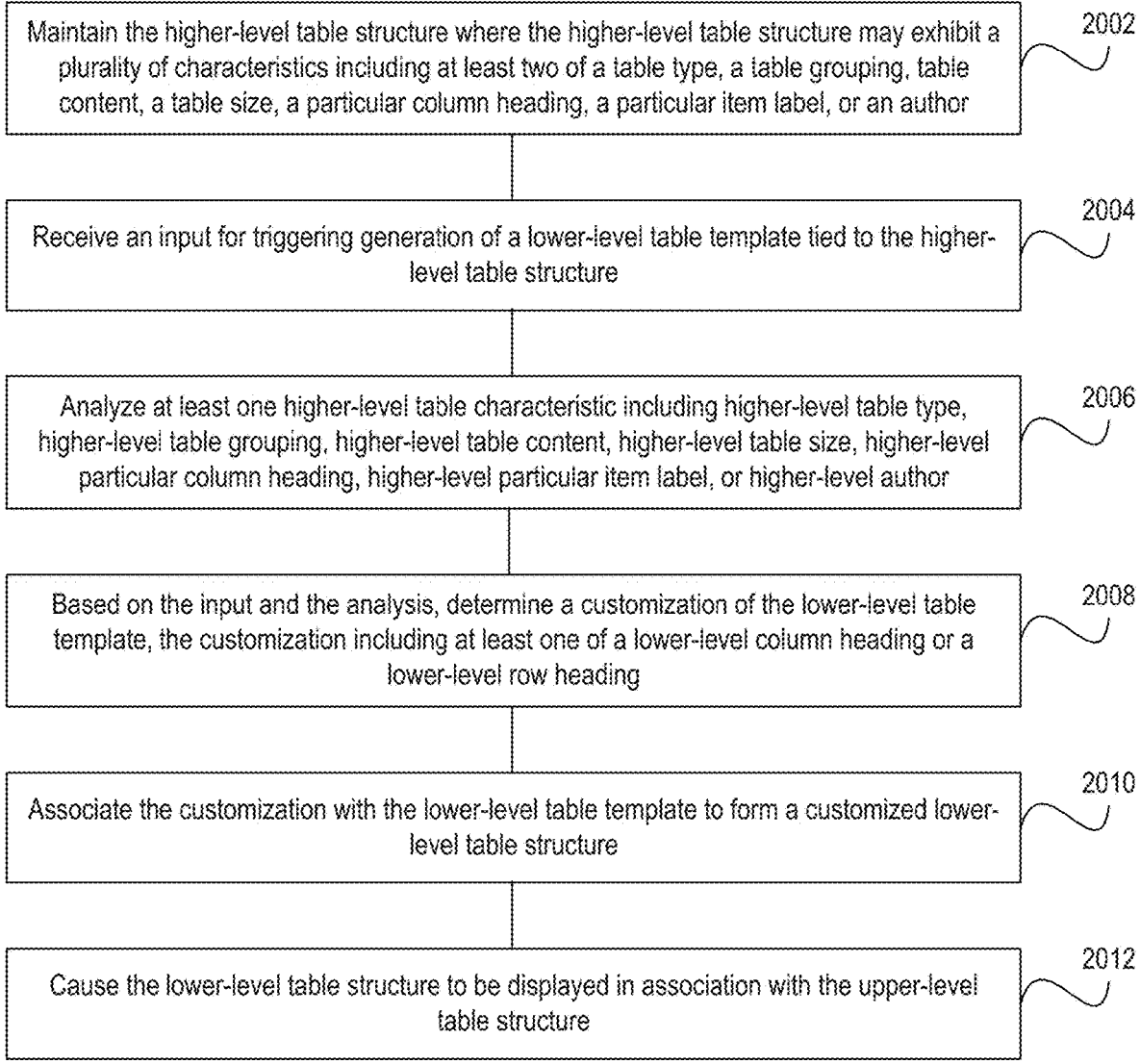
FIG. 20 illustrates exemplary block diagram for an exemplary method for automatic generation of customized lower-level table templates based on data in an associated higher-level table structure, consistent with some embodiments of the present disclosure.

FIG. 20 illustrates an exemplary block diagram of an exemplary method for generating customized lower-level table templates based on data in an associated higher-level table structure, consistent with some embodiments of the present disclosure. Method 2000, as shown in FIG. 20, with block 2002 may maintain the higher-level table structure having first rows, first columns, and first cells at intersections of first rows and first columns, wherein the first cells may be configured to hold values, and wherein the higher-level table structure may exhibit a plurality of characteristics including at least two of a table type, a table grouping, table content, a table size, a particular column heading, a particular item label, or an author, as previously discussed. At block 2004, method 2000 may receive an input for triggering generation of a lower-level table template tied to the higher-level table structure, as previously discussed. At block 2006, method 2000 may analyze at least one higher-level table characteristic including higher-level table type, higher-level table grouping, higher-level table content, higher-level table size, higher-level particular column heading, higher-level particular item label, or higher-level author, as previously discussed. At block 2008, method 2000 may, based on the input and the analysis, determine a customization of the lower-level table template, the customization including at least one of a lower-level column heading or a lower-level row heading, as previously discussed. At block 2010, method 2000 may associate the customization with the lower-level table template to form a customized lower-level table structure, as previously discussed. At block 2012, method 2000 may cause the lower-level table structure to be displayed in association with the upper-level table structure, consistent with the disclosure discussed above.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

- maintaining for presentation on a viewable interface a higher-level table structure having first rows, first columns and first cells at intersections of first rows and first columns;
- maintaining for presentation on the viewable interface a lower-level table structure having second rows, second columns and second cells at intersections of second rows and second columns;
- linking the lower-level table to a specific first cell in the higher-level table;
- wherein the specific first cell is configured to present a milestone indicator;
- storing a specific conditional rule associating the specific first cell with a plurality of second cells of the lower-level table, such that entry of qualifying data into each of the plurality of second cells triggers the specific conditional rule to cause a change in the specific first cell of the higher-level table;
- receiving qualifying information from each of the plurality of second cells;
- upon receipt of the qualifying information from each of the plurality of second cells, triggering the specific conditional rule to thereby update milestone information in the specific first cell of the higher-level table;
- wherein prior to updating the specific first cell, the specific first cell is empty and updating causes the milestone indicator to be added to the specific first cell;
- wherein prior to updating of the specific first cell, the specific first cell contains an original milestone indicator and updating causes the original milestone indicator to be replaced by an updated milestone indicator thereby reflecting progress in a workflow;

causing the lower-level table to be selectively expandable and collapsible on the viewable interface and upon receipt of a collapsing command, cause the lower-level table to be hidden from view;

receiving from a rule-builder interface, specific conditions in second cells of the lower-level table that trigger the milestone update in the first specific cell of the higher-level table;

receiving from the rule-builder interface, specific variables for each of the plurality of second cells, to prevent the specific conditional rule to be triggered until each of the specific variables exists in an associated second cell;

storing the specific conditional rule as a template for application to additional lower-level tables;

maintaining the higher-level table structure having first rows, first columns, and first cells at intersections of the first rows and first columns;

wherein the first cells are configured to hold values;

wherein the higher-level table structure exhibits a plurality of characteristics including at least two of a table type, a table grouping, table content, a table size, a particular column heading, a particular item label, or an author;

receiving an input for triggering generation of a lower-level table template tied to the higher-level table structure;

analyzing at least one higher-level table characteristic including a higher-level table type, higher-level table grouping, higher-level table content, higher-level table size, higher-level particular column heading, higher-level particular item label, or higher-level author;

based on the input and the analysis, determining a customization of the lower-level table template, the customization including at least one of a lower-level column heading or a lower-level row heading;

associating the customization with the lower-level table template to form a customized lower-level table structure;

causing the lower-level table structure to be displayed in association with the higher-level table structure;

wherein the triggering occurs as a result of activation of a button;

determining when conditions in the higher-level table structure meet a criterion for automatically generating a lower-level table structure;

wherein the input occurs as a result of the determination that the criterion is met;

determining a customization of a plurality of differing lower-level table structures depending on specific characteristics of the higher-level table structure;

receiving an instruction for triggering generation of a sub-lower-level table template tied to the lower-level table structure;

analyzing at least one lower-level table characteristic, including lower-level table type, lower-level table grouping, lower-level table content, lower-level table size, lower-level particular column heading, lower-level particular item label, or lower-level author;

based on the instruction and at least one of the higher-level table characteristic and the lower-level table characteristic, determining a customization of the sub-lower-level table template, the sub-lower-level customization including at least one of a sub-lower-level column heading or a sub-lower-level row heading;

associating the customization of the sub-lower-level table template with the sub-lower-level table template to form a customized sub-lower-level table structure;

causing the sub-lower-level table structure to be displayed in association with the lower-level table structure;

wherein determining the customization of the lower-level table template includes presenting options for lower-level template structure and receiving a selection in response; and storing the lower-level template structure for use with a later-developed higher-level table structure clone.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for implementing conditional rules in a hierarchical table structure, the system comprising:
at least one processor configured to:
maintain for presentation on a viewable interface a higher-level table structure having first rows, first columns and first cells at intersections of first rows and first columns;
maintain for presentation on the viewable interface a lower-level table structure having second rows, second columns and second cells at intersections of second rows and second columns;
link the lower-level table structure to a specific first cell in the higher-level table structure, wherein the specific first cell is configured to present a milestone indicator;
store a specific conditional rule associating the specific first cell with a plurality of second cells of the lower-level table structure, such that entry of qualifying data into each of the plurality of second cells triggers the specific conditional rule to cause a change in the specific first cell of the higher-level table structure;
receive qualifying information from each of the plurality of second cells; and
upon receipt of the qualifying information from each of the plurality of second cells, trigger the specific conditional rule to thereby update milestone information in the specific first cell of the higher-level table structure.

2. The system of claim 1, wherein prior to updating the specific first cell, the specific first cell is empty and updating causes the milestone indicator to be added to the specific first cell.

3. The system of claim 1, wherein prior to updating of the specific first cell, the specific first cell contains an original milestone indicator and updating causes the original milestone indicator to be replaced by an updated milestone indicator thereby reflecting progress in a workflow.

4. The system of claim 1, wherein the at least one processor is further configured to cause the lower-level table to be selectively expandable and collapsible on the viewable interface and upon receipt of a collapsing command, cause the lower-level table to be hidden from view.

5. The system of claim 1, wherein the at least one processor is further configured to receive from a rule-builder interface, specific conditions in second cells of the lower-level table that trigger the milestone update in the first specific cell of the higher-level table.

6. The system of claim 5, wherein the at least one processor is further configured to receive from the rule-builder interface, specific variables for each of the plurality of second cells, to prevent the specific conditional rule to be triggered until each of the specific variables exists in an associated second cell.

7. The system of claim 1, wherein the at least one processor is further configured to store the specific conditional rule as a template for application to additional lower-level tables.

8. A non-transitory computer readable medium containing instructions that when executed by at least one processor, cause the at least one processor to perform operations for implementing conditional rules in a hierarchical table structure, the operations comprising:
maintaining for presentation on a viewable interface a higher-level table structure having first rows, first columns and first cells at intersections of first rows and first columns;
maintaining for presentation on the viewable interface a lower-level table structure having second rows, second columns and second cells at intersections of second rows and second columns;
linking the lower-level table structure to a specific first cell in the higher-level table structure, wherein the specific first cell is configured to present a milestone indicator;
storing a specific conditional rule associating the specific first cell with a plurality of second cells of the lower-level table structure, such that entry of qualifying data into each of the plurality of second cells triggers the specific conditional rule to cause a change in the specific first cell of the higher-level table structure;
receiving qualifying information from each of the plurality of second cells; and
upon receipt of the qualifying information from each of the plurality of second cells, triggering the specific conditional rule to thereby update milestone information in the specific first cell of the higher-level table structure.

9. The non-transitory computer readable medium of claim 8, wherein prior to updating the specific first cell, the specific first cell is empty and updating causes the milestone indicator to be added to the specific first cell.

10. The non-transitory computer readable medium of claim 8, wherein prior to updating of the specific first cell, the specific first cell contains an original milestone indicator and updating causes the original milestone indicator to be replaced by an updated milestone indicator thereby reflecting progress in a workflow.

11. The non-transitory computer readable medium of claim 8, wherein the operations further comprise causing the lower-level table to be selectively expandable and collapsible on the viewable interface and upon receipt of a collapsing command, cause the lower-level table to be hidden from view.

12. The non-transitory computer readable medium of claim 8, wherein the operations further comprise receiving from a rule-builder interface, specific conditions in second cells of the lower-level table that trigger the milestone update in the first specific cell of the higher-level table.

13. The non-transitory computer readable medium of claim 12, wherein the operations further comprise receiving from the rule-builder interface, specific variables for each of the plurality of second cells, to prevent the specific conditional rule to be triggered until each of the specific variables exists in an associated second cell.

14. The non-transitory computer readable medium of claim 8, wherein the operations further comprise storing the specific conditional rule as a template for application to additional lower-level tables.

15. A method for implementing conditional rules in a hierarchical table structure, the method comprising:
    maintaining for presentation on a viewable interface a higher-level table structure having first rows, first columns and first cells at intersections of first rows and first columns;
    maintaining for presentation on the viewable interface a lower-level table structure having second rows, second columns and second cells at intersections of second rows and second columns;
    linking the lower-level table structure to a specific first cell in the higher-level table structure, wherein the specific first cell is configured to present a milestone indicator;
    storing a specific conditional rule associating the specific first cell with a plurality of second cells of the lower-level table structure, such that entry of qualifying data into each of the plurality of second cells triggers the specific conditional rule to cause a change in the specific first cell of the higher-level table structure;
    receiving qualifying information from each of the plurality of second cells; and
    upon receipt of the qualifying information from each of the plurality of second cells, triggering the specific conditional rule to thereby update milestone information in the specific first cell of the higher-level table structure.

16. The method of claim 15, wherein prior to updating the specific first cell, the specific first cell is empty and updating causes the milestone indicator to be added to the specific first cell.

17. The method of claim 15, wherein prior to updating of the specific first cell, the specific first cell contains an original milestone indicator and updating causes the original milestone indicator to be replaced by an updated milestone indicator thereby reflecting progress in a workflow.

18. The method of claim 15, the method further comprising causing the lower-level table to be selectively expandable and collapsible on the viewable interface and upon receipt of a collapsing command, cause the lower-level table to be hidden from view.

19. The method of claim 15, the method further comprising receiving from a rule-builder interface, specific conditions in second cells of the lower-level table that trigger the milestone update in the first specific cell of the higher-level table.

20. The method of claim 19, the method further comprising receiving from the rule-builder interface, specific variables for each of the plurality of second cells, to prevent the specific conditional rule to be triggered until each of the specific variables exists in an associated second cell.

* * * * *